United States Patent [19]
Clack et al.

[11] Patent Number: 5,876,610
[45] Date of Patent: Mar. 2, 1999

[54] METHOD AND APPARATUS FOR MONITORING LIQUID FLOW THROUGH AN ENCLOSED STREAM

[75] Inventors: Robert A. Clack, Sun Prairie; Melvin R. Hemp, Lodi, both of Wis.; W. Roger McPherson, Otsego, Mich.

[73] Assignee: Clack Corporation, Windsor, Wis.

[21] Appl. No.: 820,139

[22] Filed: Mar. 19, 1997

[51] Int. Cl.⁶ .............................. B01D 17/12; G01F 1/10; G01F 1/115

[52] U.S. Cl. ..................... 210/739; 73/1.28; 73/861.08; 73/861.79; 73/861.87; 210/87; 210/282; 416/223 R

[58] Field of Search .................... 210/85, 87–89, 210/100, 143, 282, 739, 742, 745; 73/861.353, 861.78, 861.79, 861.87, 861.88, 1.27, 1.28, 861.91, 861.77, 861.08; 416/223 R

[56] References Cited

U.S. PATENT DOCUMENTS

| | | | |
|---|---|---|---|
| 3,043,140 | 7/1962 | Waugh et al. | 73/861.353 |
| 3,053,087 | 9/1962 | Waugh | 73/861.78 |
| 4,489,616 | 12/1984 | Priddy | 73/861.79 |
| 4,656,873 | 4/1987 | Stewart | 73/861.33 |
| 4,666,061 | 5/1987 | Pluess | 222/71 |
| 4,681,677 | 7/1987 | Kuh et al. | 210/88 |
| 4,700,579 | 10/1987 | Hall | 73/861.78 |
| 4,918,973 | 4/1990 | Kruse | 73/1.27 |
| 5,089,144 | 2/1992 | Ozkahyaoglu et al. | 210/87 |
| 5,372,048 | 12/1994 | Dunbar | 73/861.91 |
| 5,499,197 | 3/1996 | Fou | 210/143 |
| 5,527,451 | 6/1996 | Hembree et al. | 210/88 |
| 5,540,107 | 7/1996 | Silverman et al. | 73/861.78 |

OTHER PUBLICATIONS

Photocopy of water meter turbine, undated.

*Primary Examiner*—Joseph W. Drodge
*Attorney, Agent, or Firm*—Nilles & Nilles

[57] ABSTRACT

A liquid flow meter is designed to monitor the flow of a liquid through an enclosed stream such as through the tubes or internal passageways of a device such as a filtration system. The liquid flow meter includes an axial-flow magnetic turbine and a detector such as a reed switch that monitors turbine rotation by counting pulses. The counted pulses are then used to determine the aggregate volume of liquid that has flowed through the flow meter. When the liquid flow meter is used in a domestic potable water filtration system or in a similar application, the counted pulses can also be used in conjunction with a timer to determine liquid flow rate as well as the remaining useful life of a filter cartridge of the filtration system and/or of the remaining volumetric filtration capacity of the filter cartridge. The liquid flow meter exhibits high linearity or consistency of flow measurement over a wide range of liquid flow rates—even at very low pressures and low flow rates. The liquid flow meter also exhibits a very small pressure drop thereacross, requires minimal electrical power for operation, and is also compact and versatile so as to be usable with minimal modification to existing filter assembly designs.

73 Claims, 14 Drawing Sheets

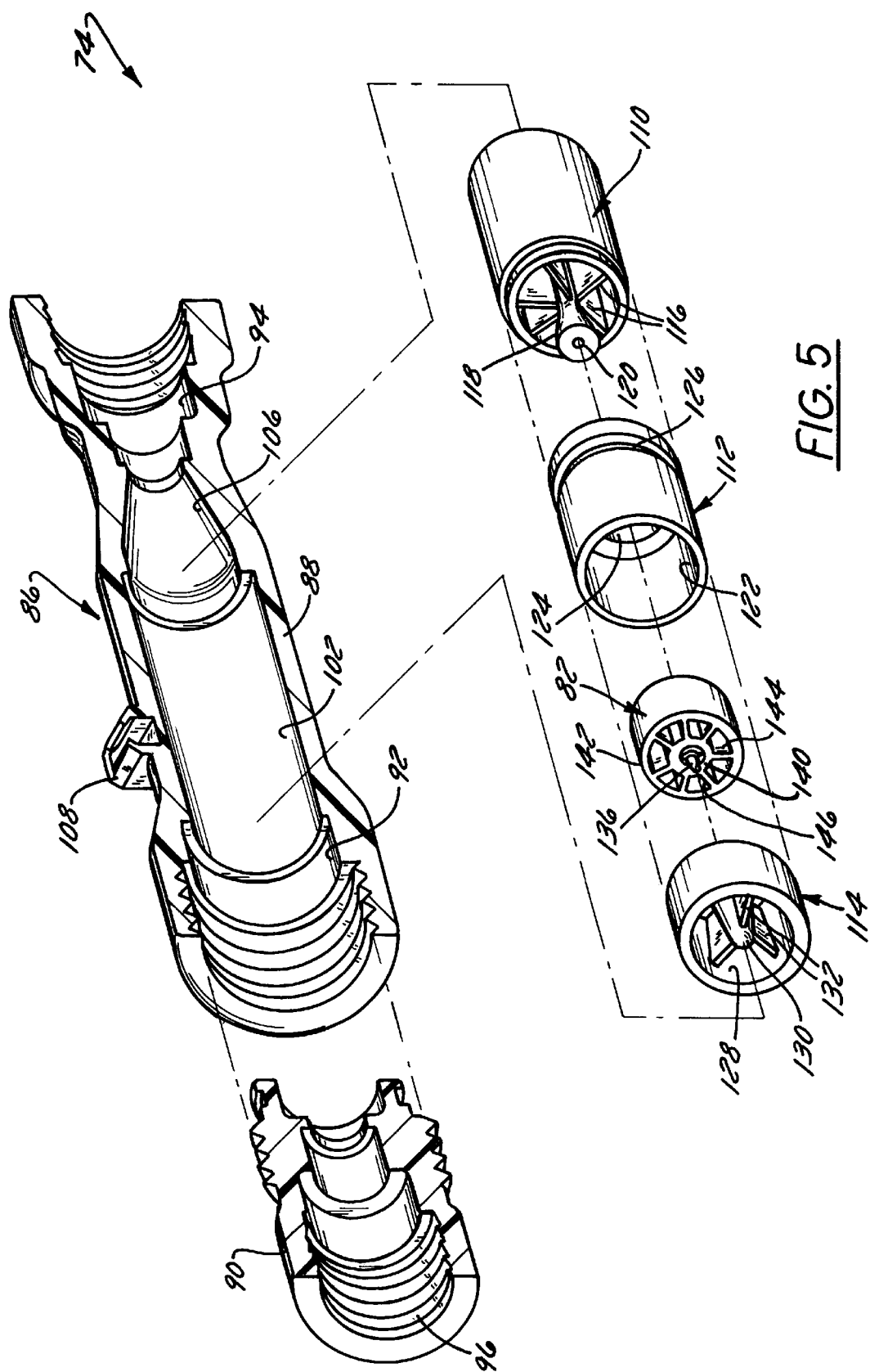

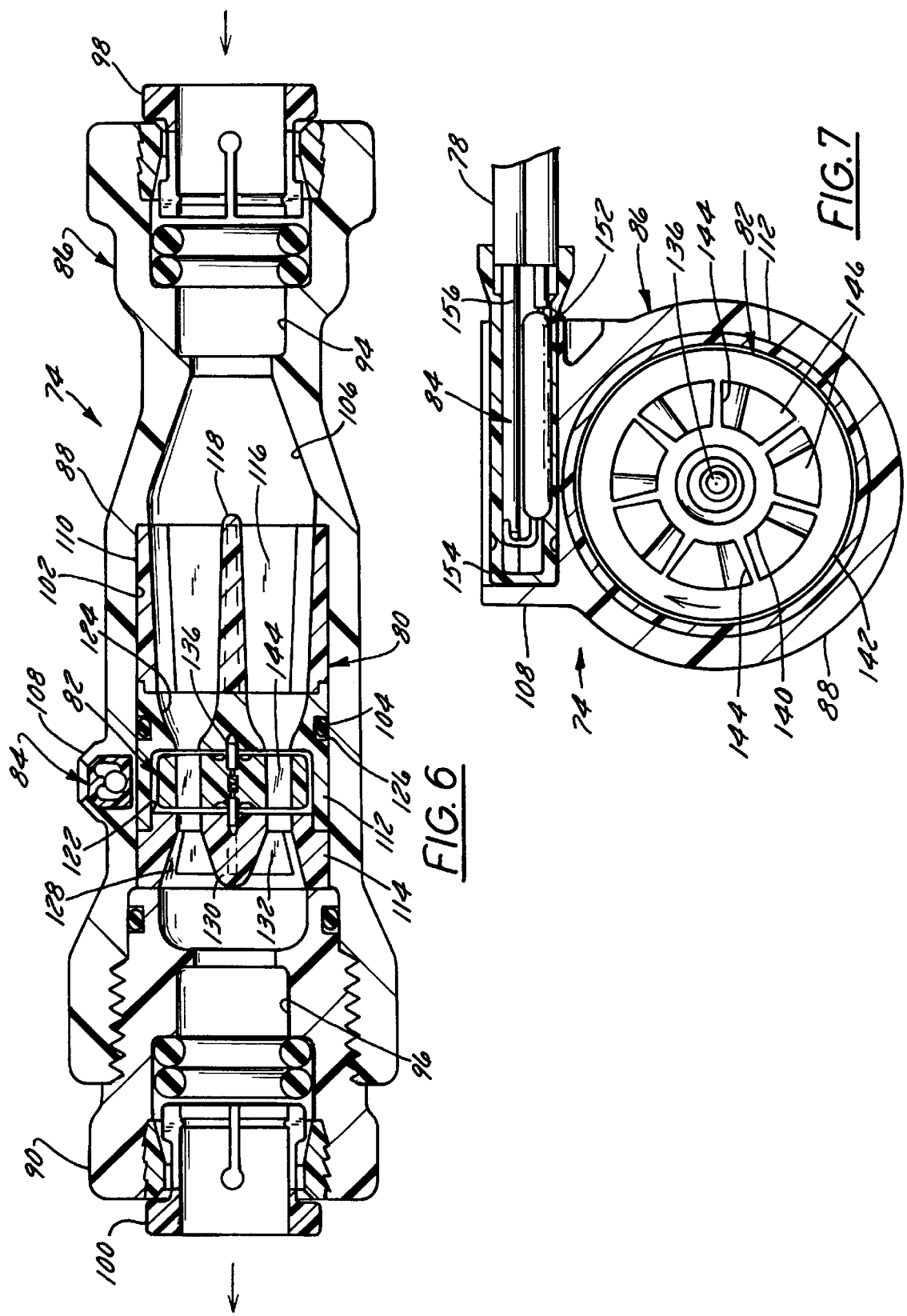

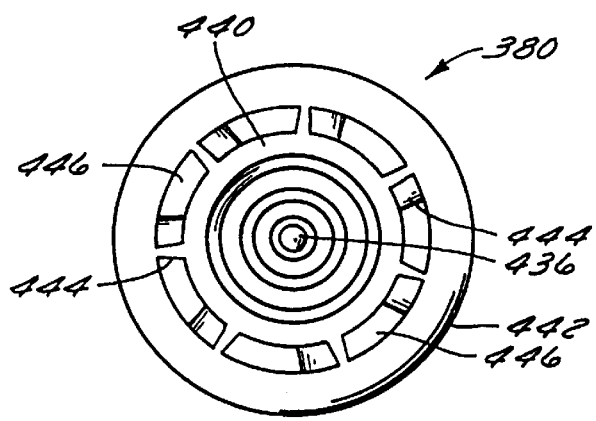
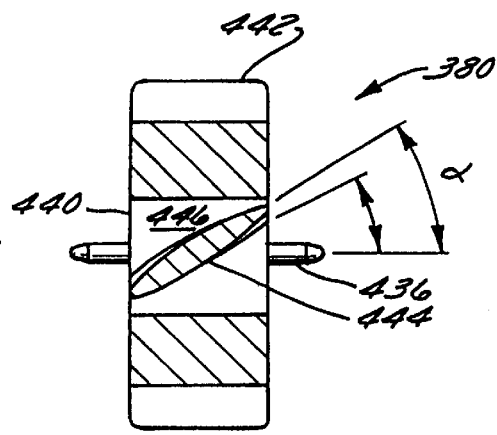
FIG. 27  FIG. 28
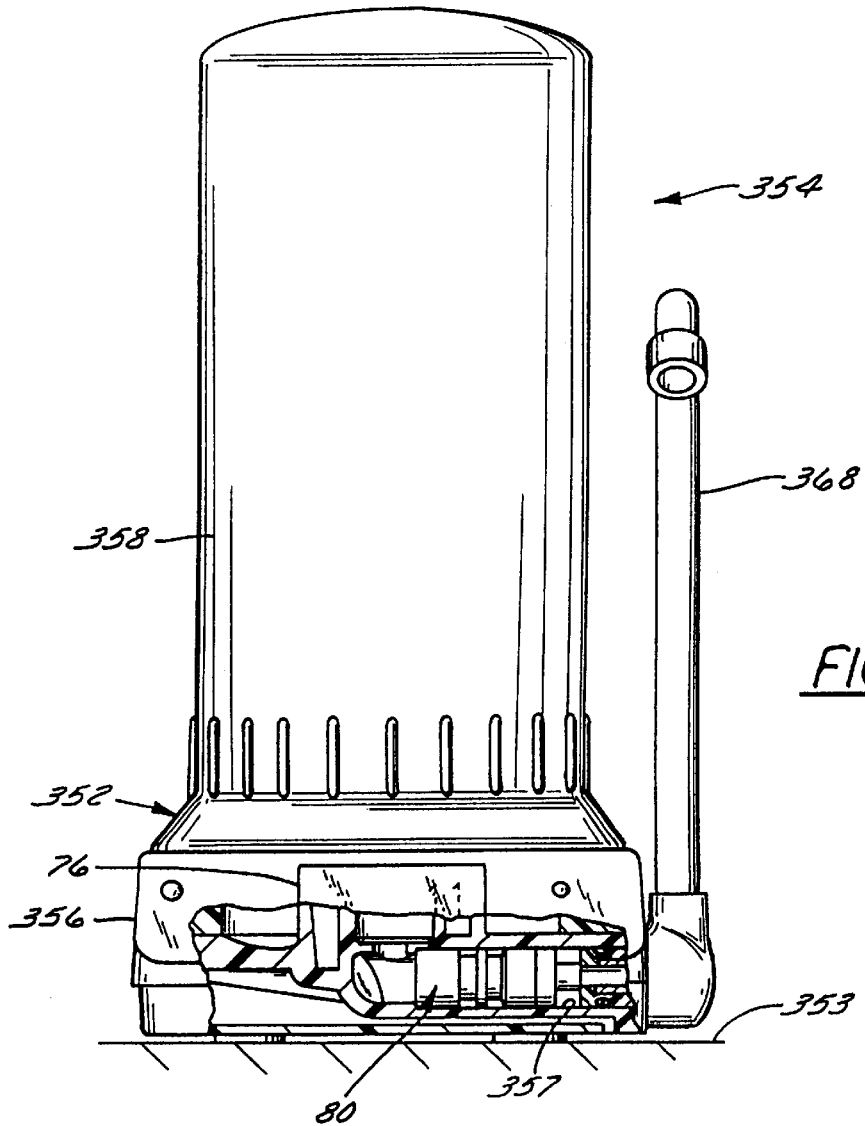
FIG. 26

METHOD AND APPARATUS FOR MONITORING LIQUID FLOW THROUGH AN ENCLOSED STREAM

BACKGROUND OF THE INVENTION

1. Field of the Invention

The invention relates to flow meters and, more particularly relates to apparatus for monitoring the volume of liquids such as potable water that flow through devices such as filter assemblies and to a method of monitoring such volumetric flow.

2. Discussion of the Related Art

Reliable liquid flow measurement is important in many applications including the beverage handling industry, the pharmaceutical industry, the photo-processing industry, and many different liquid filtration industries. One example is the domestic or household potable water filtration industry in which replaceable filter cartridges are used to treat or purify water prior to its use. Typical filter cartridges have a rated useful life in terms of their volumetric capacity. That is, the filtration effectiveness of the carbon block or other filtration media of such cartridges decreases as the aggregate volume of treated water increases. Typical filter cartridges have a rated life of 500 gallons to 2000 gallons. Failure to replace filter cartridges at the end of their rated lives may result in reduction of treated water quality. Knowing or even estimating the time at which that a filter cartridge's volumetric capacity is reached can be difficult in most households because several different people use different amounts of water without informing one another of the volumes of water used by each.

The need therefore exists to monitor volumetric liquid flow through systems or possibly other parameters relating to liquid flow such as flow rate, and this need is especially evident with respect to the flow of water through a domestic or household type potable water filtration system. However, commercially-acceptably liquid flow meters heretofore have been unavailable for several reasons. First, flow meters tended to be relatively expensive. Second, they have tended to be relatively bulky and difficult to incorporate into existing filtration system designs. Third, and most importantly from the standpoint of regulatory agencies and others who demand accurate flow measurement through relatively wide ranges of source pressures and liquid flow rates, they must be accurate. However, accurate volumetric flow measurement over relatively wide ranges of source flow rates is a difficult task, particularly at medium to low flow rates of 1 gallon per minute or less and is especially difficult at low flow rates of 0.4 gallons per minute or less.

One attempt to design a flow monitor that meets at least some of the criteria described above is disclosed in U.S. Pat. No. 5,540,107 to Silverman et al. (the Silverman patent). The flow meter or flow monitor disclosed in the Silverman patent monitors rotation of a paddle wheel. Specifically, it counts paddle wheel revolutions, then determines aggregate volumetric liquid flow based upon precalibrated data representative of volumetric flow per pulse. This data is used in conjunction with a pre-stored rated volumetric filter cartridge capacity to provide an indication that the filter cartridge associated with the flow monitor requires replacement when the cartridge's volumetric capacity is reached.

The flow monitor of the Silverman patent attempts to minimize pressure drop through an acceptable range of operating flow rates. It includes a housing presenting an impeller chamber in which is disposed an impeller or paddle wheel that essentially acts as a paddle wheel. That is, water enters the impeller chamber peripherally at a first portion, engages the fins or vanes of the paddle wheel to drive the paddle wheel to rotate as the water flows through the impeller chamber, and then exists the impeller chamber radially or at least peripherally at another location. A magnet is inserted into the paddle wheel, and a sensor having an induction coil and a flux concentrator is disposed adjacent the paddle wheel so that the sensor counts two pulses with each rotation of the paddle wheel. The counted pulses can then be used to determine volumetric liquid flow.

The flow meter disclosed in the Silverman patent exhibits several drawbacks and disadvantages.

For instance, both its paddle wheel design and its associated detector require significant torque to move or drive the paddle wheel. Significant torque is required to drive the paddle wheel because the paddle wheel presents significant resistance to the generally peripheral flow of water therethrough. Additional resistance to liquid flow through the paddle wheel occurs because the paddle wheel floats in the paddle wheel chamber and is only loosely or roughly supported. The discrete magnets and induction coil-type detector also provide significant resistance to paddle wheel movement. If left uncompensated for, the pressure drops resulting from these resistances would reduce the liquid flow rate through the flow meter by an unacceptable magnitude.

The Silverman patent was cognizant of the need to minimize pressure drops and, hence, designed features into its flow meter to reduce back pressure. Most notably, it provides a tapered inlet nozzle which directs liquid into the impeller chamber at a direction tangent to the fins or blades of the paddle wheel to increase liquid flow rates. However, by converting the potential energy of the flowing liquid to kinetic energy by accelerating the liquid prior to its entry into the paddle wheel, Silverman's nozzle necessarily increases pressure drop in its flow meter. Moreover, in order to permit the tapered nozzle to operate effectively, an inlet plenum or reservoir must be formed in the housing upstream of the nozzle. Provision of the nozzle and the plenum necessarily complicates the flow meter design and proves only partially effective in reducing pressure drop. In addition, the overall design has a somewhat limited range of linearity (i.e., a flow rate range in which a uniform number of pulses are counted for each gallon of liquid flowing through the meter).

The Silverman patent also recognizes that problems are associated with the use of a discrete magnet and states that it would be preferable to have the paddle wheel as a whole magnetic. However, Silverman considered regulatory constraints on materials, an insurmountable obstacle to this task. (It is believed that the regulatory constraints referenced in the Silverman patent are those that would prohibit the use of a paddle wheel in which materials from the magnet leach or are washed into the water.) The Silverman patent therefore requires that the magnet be a separate insert imbedded in the paddle wheel.

In addition, the complexity of the flow meter disclosed in the Silverman patent renders it unduly bulky for many applications. It simply cannot be worked into many existing filter assembly designs without significantly modifying the assembly's design.

Moreover, the configuration of the paddle wheel magnet and the induction coil-type detector impose power restraints on the system that require the use of an external AC power source and an AC to DC converter if the flow meter is to be used to monitor liquids flowing at more than 3 gallons per minute. These power restraints limit the practical applicability of the flow meter disclosed in the Silverman patent to applications in which liquids flowing at less than 3 gallons per minute are monitored.

OBJECTS AND SUMMARY OF THE INVENTION

It is therefore a first principal object of the invention to provide a liquid flow meter that accurately measures liquid flow through a system over a relatively wide range of liquid flow rates.

Another primary object of the invention is to provide a liquid flow meter which meets the first object of the invention and which minimizes pressure drops thereacross.

Another object of the invention is to provide a liquid flow meter which meets the first object of the invention and which requires minimal electrical power to monitor liquid flow and to display information indicative thereof.

Still another object of the invention is to provide a liquid flow meter which is relatively compact and which can be incorporated into existing liquid handling systems with minimal modifications thereto.

In accordance with a first aspect of the invention, this object is achieved by providing a flow meter comprising a generally cylindrical turbine cartridge having an axial bore formed therein, and a turbine mounted in the turbine cartridge so as to rotate about an axis of rotation that is at least generally parallel to an axial centerline of the bore, the turbine being made substantially entirely out of a magnetic material. Also included are a detector which monitors movement of the turbine and which generates a signal indicative of liquid flow through the turbine, and an indicator which is electronically coupled to the detector and which displays information indicative of liquid flow through the flow meter.

In order to maintain close tolerances while using molded plastic components, the turbine cartridge preferably comprises at least first and second generally cylindrical sections cooperating with one another such that each of the sections rotatably supports one end of the turbine. The components should be thin walled. Preferably, each of the cylindrical sections has an annular outer wall has a maximum thickness of less than 0.15", with the outer wall of at least one of the cylindrical sections having a maximum thickness of less than 0.063". The thinnest portions of each wall are located in those portions of each component in which maintaining close tolerances is most important.

Still another object of the invention is to provide a novel turbine for use in a liquid flow meter exhibiting one or more of the characteristics described above.

In accordance with another aspect of the invention, this object is achieved by providing a turbine that comprises a central hub rotatably mounted in the turbine cartridge, a cylindrical outer ring, and a plurality of blades extending radially outwardly from the hub to the ring, each the blade extending at an acute angle with respect to the axis of rotation.

Each blade preferably has opposed side edges which taper inwardly towards a lateral centerline of the blade such that each the blade, when viewed in transverse cross-section, is generally elliptical in shape. This tapered profile promotes laminar fluid flow and helps draw the turbine through the chamber in which it is mounted.

The material from which the turbine is formed preferably comprises a molded composite material comprising a magnetic powder admixed with a polymer carrier. The composite material comprises about 25% to 60% by volume neodymium iron boron, about 40% to 75% by volume nylon, and trace amounts by volume of a flow promotor or a processing agent.

Yet another object of the invention is to provide a water filtration system having a liquid flow meter meeting one or more of the characteristics described above.

In accordance with another aspect of the invention, this object is achieved by providing a filtration system comprising a filter assembly having a raw liquid inlet and a treated liquid outlet, and a flow meter which monitors the flow of liquid through the filter assembly, the flow meter having one or more of the characteristics described above.

The filter assembly may comprise an under-the-counter assembly or another assembly lacking a base with large internal passageways. The flow meter in this case may additionally comprises an elongated housing in which the turbine cartridge is disposed such that an inner peripheral wall of the housing supports the turbine cartridge and prevents the turbine cartridge from leaking. The housing preferably includes 1) a body having an upstream end and a downstream end and 2) a cap attached to the downstream end of the body. The turbine cartridge is disposed in a bore extending longitudinally through the body, and a portion of the bore, located between the upstream end of the body and the turbine cartridge, increases continuously in diameter from an upstream end of the portion to a downstream end of the portion.

The filter assembly may comprise a countertop assembly or another assembly having a base with a relatively large internal passageway. In this case the turbine cartridge may be mounted in the internal passageway such that a peripheral wall of the passageway supports the turbine cartridge and prevents the turbine cartridge from leaking. In this case, the cartridge housing may be eliminated.

The system also preferably comprises an indicator which receives signals from the computer and which at least selectively displays information indicative of liquid flow through the filter assembly. The computer preferably includes a timing circuit and a counter. The computer calculates aggregate volumetric flow through the filter assembly and at least one of volumetric flow rate and elapsed time, and the indicator at least selectively displays at least one of remaining volumetric capacity, volumetric flow rate, and remaining useful life of the filter assembly.

Yet another object of the invention is to provide an improved method of monitoring the flow of liquid through an enclosed stream.

In accordance with still another aspect of the invention, this object is achieved by placing a turbine in an enclosed stream of liquid flowing through the filter assembly such that the flowing liquid causes the turbine to rotate, at a velocity that varies substantially linearly with a volumetric flow rate of liquid through the filter assembly for at least a designated range of liquid flow rates, detecting rotation of the turbine, and determining, using the detected turbine rotation and previously-obtained information correlating turbine rotation and liquid flow, the volume of liquid that flows through the filter assembly. The designated range, which preferably is on the order of a 10:1 ratio, may extend from about 0.4 gallons per minute to about 4.0 gallons per minute or from about 0.2 gallons per minute to 2.0 gallons per minute depending upon the selected turbine geometry.

The step of detecting turbine rotation preferably comprises generating only one magnetic pulse for each revolution of the turbine, detecting each pulse using a magnetic pick-up device, and determining the number of pulses detected during each interval of a selected period of time.

The method preferably includes operating the flow meter in a SLEEP mode in which energization of the visual indicator is disabled whenever no liquid flow through the turbine is detected for a designated period of time.

Yet another object of the invention is to provide an improved method of calibrating a liquid flow meter.

In accordance with yet another aspect of the invention, this object is achieved by monitoring liquid flow through an enclosed stream. The monitoring step is performed by a flow meter and includes placing a turbine of the flow meter in the enclosed stream such that the flowing liquid causes the turbine to rotate at a velocity that varies with the flow rate of liquid through the enclosed stream, detecting rotation of the turbine, and determining, using the detected turbine rotation and previously-obtained information correlating the turbine rotation and liquid flow, information indicative of fluid flow through the enclosed stream. The calibrating step includes measuring the number of turbine revolutions occurring when a designated, previously-known volume of the liquid flows through the turbine, and then calculating, from the measurement, a number of revolutions per unit volume to be used during subsequent flow measurements of the liquid. Preferably, the calibrating step is performed under a temperature, a volume, and a duty cycle projected to occur during normal projected use of the flow meter.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 5 is a partially cut-away perspective view of the sensor assembly of the liquid flow meter;

FIG. 6 is a sectional side elevation view of the sensor assembly of FIG. 5;

FIG. 7 is a sectional end elevation view of the sensor assembly of FIGS. 5 and 6;

FIG. 26 is a partially cut-away side elevation view of a filtration system incorporating a liquid flow meter constructed in accordance with a second preferred embodiment of the invention;

FIG. 27 is an end elevation view of an alternative turbine usable in the liquid flow meter of the present invention; and FIG. 28 is a sectional side elevation view taken along the lines 28—28 in FIG. 27.

DETAILED DESCRIPTION OF THE PREFERRED EMBODIMENTS

1. Resume

Figure 1:
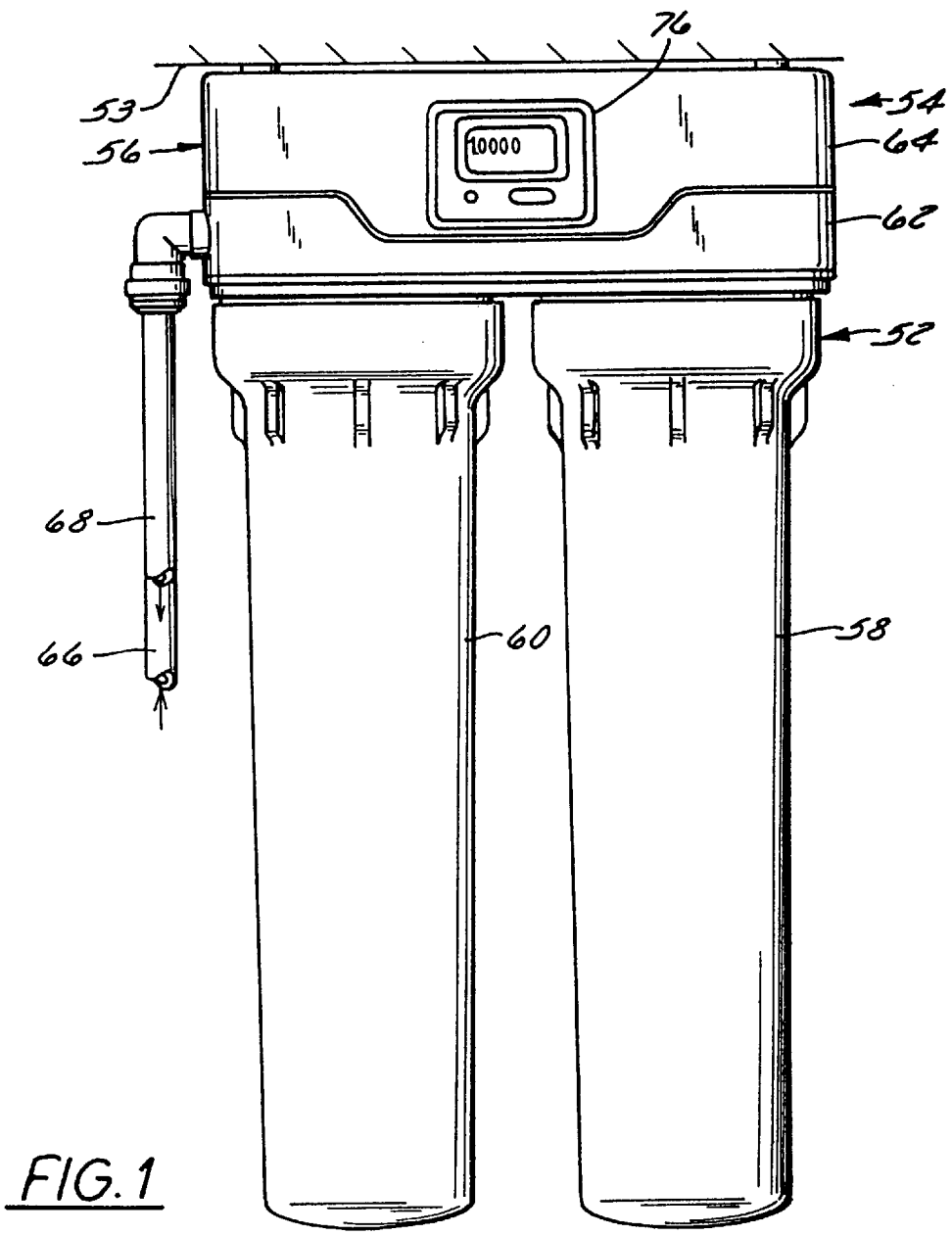
FIG. 1 is a filtration system incorporating a liquid flow meter constructed in accordance with a first preferred embodiment of the present invention.

Pursuant to the invention, a liquid flow meter is provided for monitoring the flow of a liquid through an enclosed stream such as through the tubes or internal passageways of a device such as a filtration system. The liquid flow meter includes an axial-flow magnetic turbine and a detector such as a reed switch that monitors turbine rotation by counting pulses. The counted pulses are then used to determine the aggregate volume of liquid that has flowed through the flow meter. When the liquid flow meter is used in a domestic potable water filtration system or in a similar application, the counted pulses can also be used in conjunction with a timer to determine liquid flow rate as well as the remaining useful life of a filter cartridge of the filtration system and/or of the remaining volumetric filtration capacity of the filter cartridge. The liquid flow meter exhibits high linearity or consistency of flow measurement over a wide range of liquid flow rates—even at very low pressures and low flow rates. The liquid flow meter also exhibits a very small pressure drop thereacross, requires minimal electrical power for operation, and is also compact and versatile so as to be usable with minimal modification to existing filter assembly designs.

2. System Overview

Referring to the drawings and initially to FIGS. 1–4 in particular, a liquid flow meter 50 constructed in accordance with a first preferred embodiment of the invention is shown in conjunction with a standard under-the-counter type filter assembly 52 to form a filtration system 54 with an internal flow meter. However, it should be understood that the liquid flow meter 50 could be used in virtually any application in which liquids flow through an enclosed stream such as a tube, conduit, or internal passageway and in which an accurate indication of liquid flow through the enclosed stream is desired.

The illustrated filter assembly 52 is, except for receiving the liquid flow meter 50, conventional. The filter assembly 52 includes a base 56 configured for mounting on a wall (not shown) beneath a countertop 53 and at least one filter cartridge mounted on and extending downwardly from the base. However, the filter assembly 52 could also be mounted on a countertop or even mounted to extend horizontally. The flow meter 50 would operate equally as well because its flow sensor 74 (detailed below) is not orientation sensitive. The illustrated embodiment has two filter cartridges 58, 60 hereafter referred to as "the first stage filter cartridge" 58 and "the second stage filter cartridge" 60, respectively. The base 56 is formed from a lower section 62 and an upper section 64. The upper section 64 of the base 56 mounts on the lower section 62 to form a chamber therebetween. The lower section 62 has internal flow conduits and fittings formed therein for conveying liquids between a supply tube 66 connected to a source of raw water, the first stage filter cartridge 58, the second stage filter cartridge 60, and a treated water discharge tube 68. A supply tube 72, positioned in the chamber between the lower section 62 and the upper section 64, connects the outlet of the first stage filter cartridge 58 to the inlet of the second stage filter cartridge 60. Mounting the sensor assembly 74 downstream of at least one filter cartridge of the monitored filtration system is desirable because the first stage filter removes large particulates that might otherwise interfere with operation of the sensor assembly.

Figure 4:
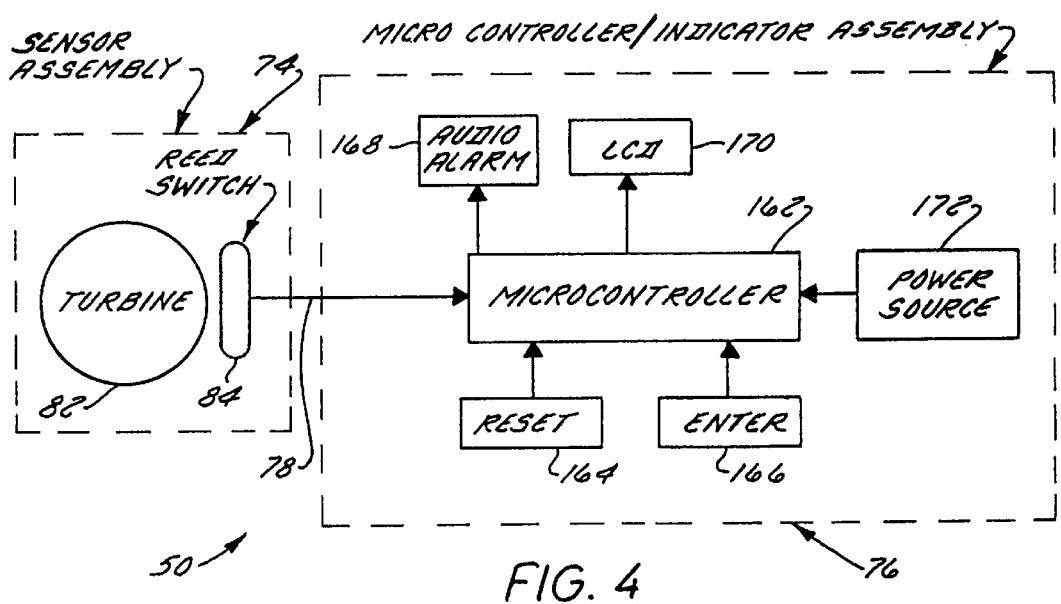
FIG. 4 schematically illustrates the major components of the liquid flow meter of FIGS. 1–3.

Referring especially to FIG. 4, the liquid flow meter 50 includes a sensor assembly 74 and a microcontroller/indicator assembly 76 connected to one another by an electrical cable 78. The sensor assembly 74 is inserted in the supply tube 72, and the microcontroller/indicator assembly 76 is mounted in an aperture in the upper section 64 of the base 56 as seen in FIG. 1 so as to be visible and accessible by a user.

In use, water to be treated enters the filter assembly 52 of the filtration system 54 through the supply tube 66, is treated in the first stage filter cartridge 58, flows through the supply tube 72 and sensor assembly 74, is treated further in the second stage filter cartridge 60, and then is discharged from the filter assembly 52 through the discharge tube 68. The liquid flow meter 50 monitors at least the volume and possibly also the flow rate of the liquid flowing from the first stage filter cartridge 58 to the second stage filter cartridge 60 and provides an indication of the monitored parameter(s).

The preferred structure and operation of the liquid flow meter 50 will now be detailed.

3. Construction of Liquid Flow Meter

As discussed briefly above, the liquid flow meter 50 includes the sensor assembly 74 and the microcontroller/indicator assembly 76. The sensor assembly 74 includes a turbine cartridge 80, a turbine 82, and a detector 84 that detects movement of the turbine 82 (FIGS. 4–6). In the illustrated embodiment in which the sensor assembly 74 is disposed at a location in which the filter assembly 52 lacks adequate rigidity to support the turbine cartridge 80, the sensor assembly 74 additionally includes a housing 86 that supports the turbine cartridge 80. Each of these components will now be detailed.

Figure 2:
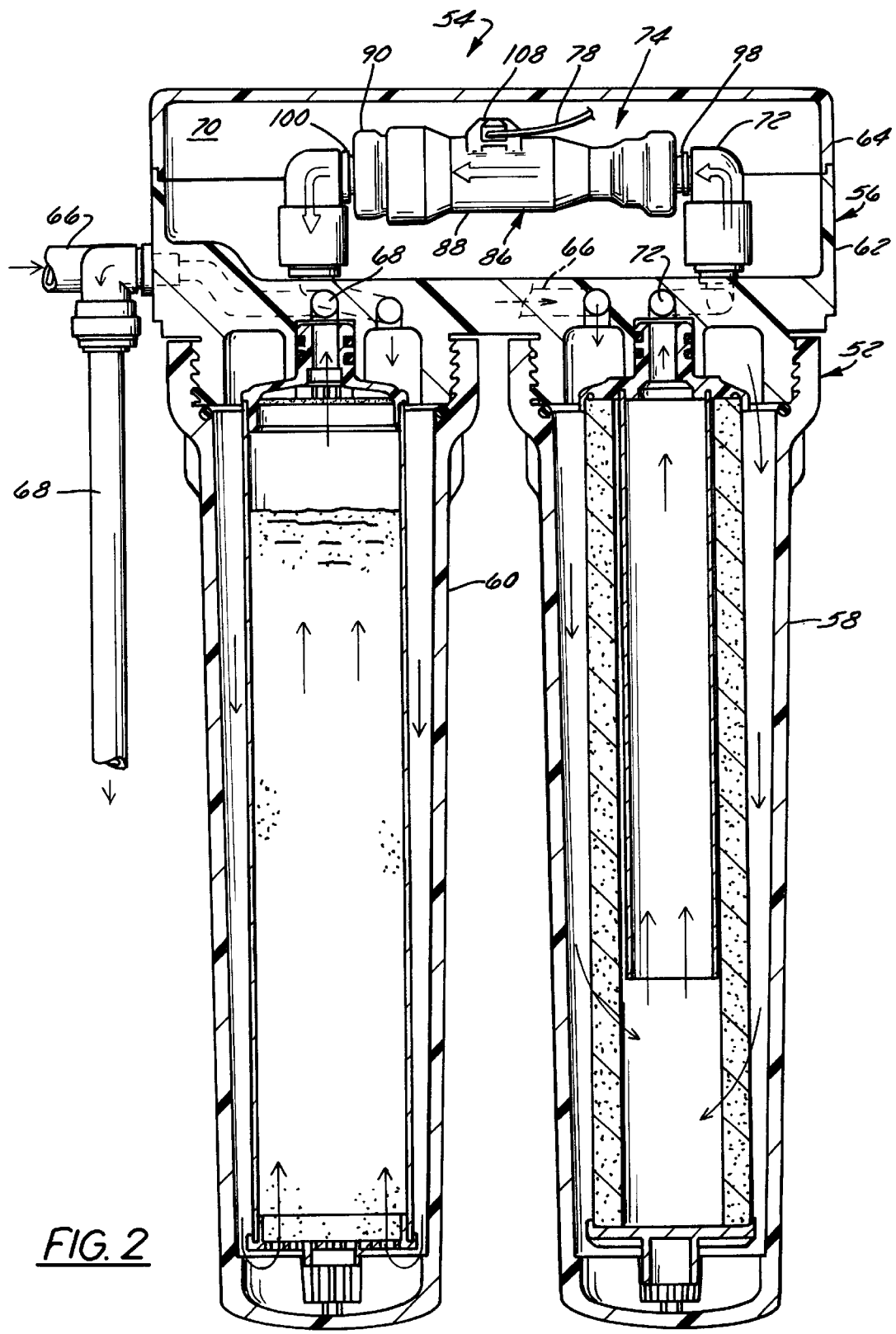
FIG. 2 is a sectional side elevation view of the filtration system of FIG. 1.

Referring now to FIGS. 5–7, the cartridge housing 86 is designed to house and support the turbine cartridge 80 in those applications in which the filter assembly 52 or other structure with which the flow meter 50 is being used lacks a structure capable of performing these functions. The housing 86 includes 1) a body 88 having an upstream end and a downstream end (the downstream end being seen to the left of the arrow in FIG. 2) and 2) a cap 90 threaded onto the downstream end of the body 88. A bore 92 is formed axially through the body 88 and the cap 90. Inlet and outlet ports 94 and 96 are formed by the upstream end and downstream end of the bore 92, respectively. These ports 94 and 96 receive suitable fittings 98 and 100 for connection to sections of the supply tube 72 as best seen in FIGS. 2 and 6. A cartridge chamber 102, formed from an enlarged, constant diameter section of the bore 92 begins at the downstream end of the body 88 and extends a substantial distance towards the upstream end. Another portion 106 of the bore 92, located between the upstream end of the body 88 and the cartridge chamber 102, increases continuously in diameter from the upstream end of the portion 106 to the downstream end of the portion 106 to provide a smooth transition from the inlet port 94 to the cartridge chamber 102. A detector housing 108 is formed on an outer wall of the body 88 adjacent the cartridge chamber 102 for receiving the detector 84 in a snap-fit manner as detailed below.

Figure 8:
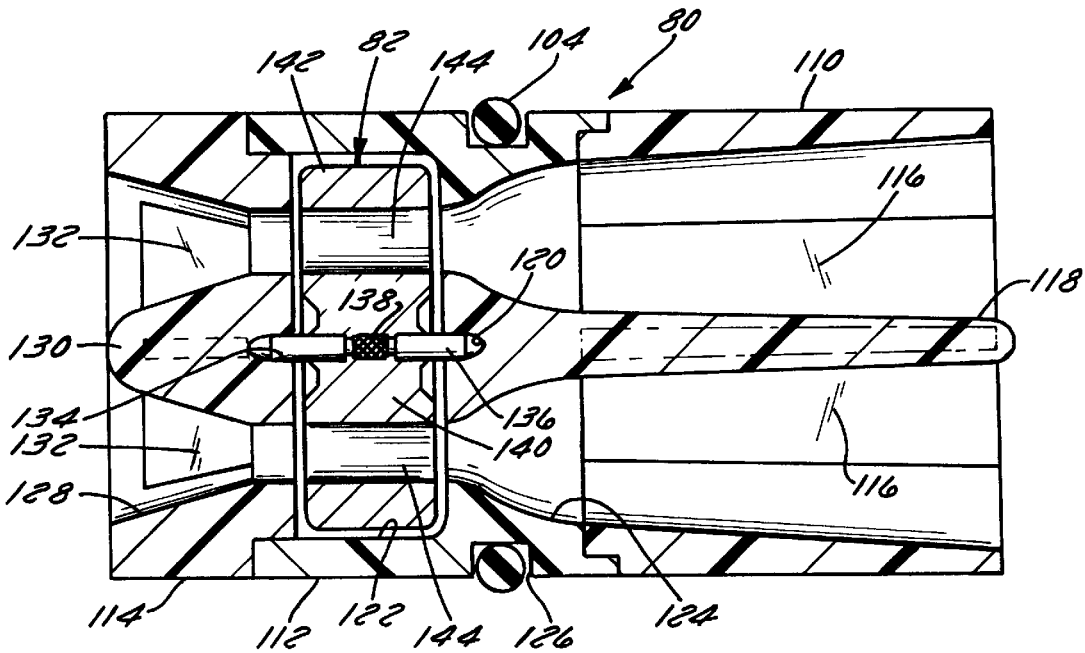
FIG. 8 is a sectional side elevation view of the turbine cartridge and turbine of the sensor assembly of FIGS. 5–7.
Figure 10:
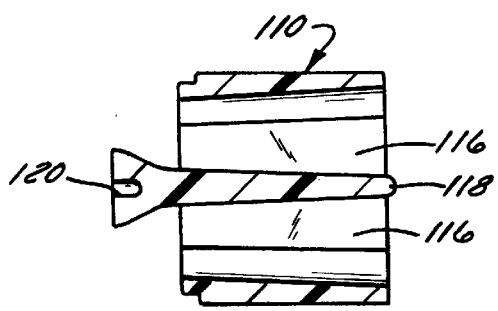
FIG. 10 is a sectional side elevation view taken along the lines 10—10 in FIG. 9.
Figure 9:
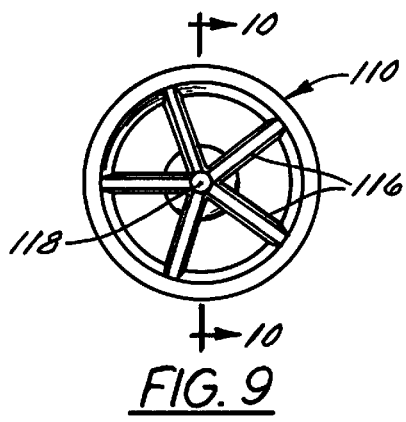
FIG. 9 is an end view of the flow divider of the turbine cartridge of FIGS. 5–8.
Figure 12:
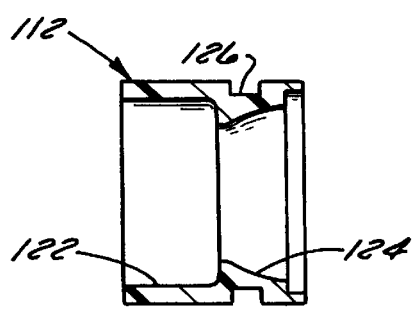
FIG. 12 is a sectional side elevation view taken along the lines 12—12 in FIG. 11.
Figure 11:
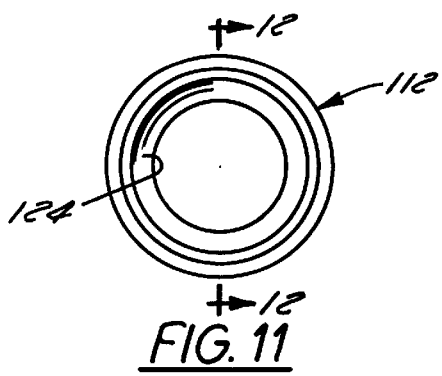
FIG. 11 is an end view of the turbine housing for the turbine cartridge of FIGS. 5–8.
Figure 13:
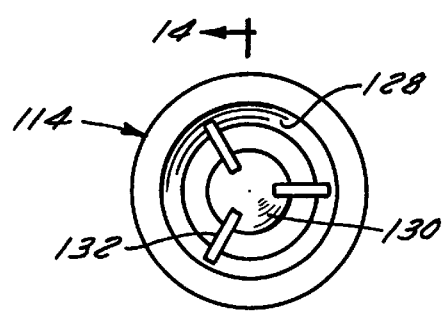
FIG. 13 is an end view of the exit cone of the turbine cartridge of FIGS. 5–8.
Figure 14:
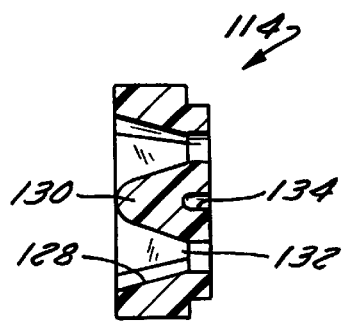
FIG. 14 is a sectional side elevation view taken along the lines 14—14 in FIG. 13.

The turbine cartridge 80, which is sealed in the cartridge chamber 102 of the housing 86 by an O-ring 104, serves several functions. First, it rotatably supports the turbine 82. Second, it is designed to promote laminar liquid flow into and out of the turbine 82 with minimal pressure drop. Third, it is shaped and configured to be usable in a wide variety of locations, thereby facilitating the incorporation of the liquid flow meter 50 into existing filter assembly designs with minimal modification. Fourth, it is designed to hold very close tolerances despite the fact that it is made out of plastic. Towards these ends, the turbine cartridge 80 is formed from a multi-component plastic structure in which each of the components is relatively small and has relatively thin walls to facilitate molding and to hold close tolerances. All of these components preferably are formed from a molded copolymer acetal known as Celcon. Celcon is preferred because it is dimensionally stable both in molding and in use in water and other liquids. It also has good wear characteristics and exhibits a low coefficient of friction. The illustrated and preferred turbine cartridge 80 has three components: an upstream flow straightener 110, a central turbine housing 112, and a downstream exit cone 114 (FIGS. 5, 6, and 8). In order to facilitate molding while holding very tight tolerances, the outer peripheral wall of each of the components 110, 112, and 114 is very thin, usually having an average thickness of less about than 0.15", and preferably less than about 0.063" on average.

The flow straightener 110, best seen in FIGS. 5, 6, 9, and 10, has a plurality of rib-like structures 116 formed therein which extend radially from the inner surface of the outer peripheral wall of the flow straightener 110 to a central post 118. These rib-like structures 116 promote laminar liquid flow into the turbine 82 by straightening liquid flowing into the flow straightener 110 from the inlet of the cartridge housing 86. The central post 118 is collinear with an axial centerline of the bore 92. The downstream axial end of this post 118 has an aperture 120 formed therein to form a bearing for supporting the turbine 82 as discussed below.

Referring to FIGS. 5, 6, 11, and 12, turbine housing 112 is clamped between the flow straightener 110 and the exit cone 114. Turbine housing 112 presents an axial bore including a downstream turbine chamber 122 and an upstream portion 124. The turbine 82 is housed in the turbine chamber 122 with slight axial and radial clearances. The upstream portion 124 curves outwardly from the turbine chamber 122 to the upstream end of the turbine housing 112 to promote laminar flow into the turbine 82. A groove 126 is formed in the outer peripheral surface of the turbine housing 112 for receiving the O-ring 104.

The exit cone 114, best seen in FIGS. 5, 6, 13, and 14, also has outwardly flared walls 128 extending along at least a substantial length thereof to further reduce back pressure. A second post 130, supported in the exit cone by radial supports 132, extends in parallel with the axial centerline of the turbine cartridge 82. Post 130 has an aperture 134 formed in its upstream end for supporting the turbine 82 as detailed below.

Figure 16:
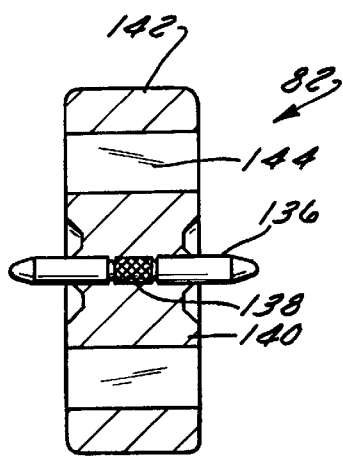
FIG. 16 is a sectional side elevation view taken along the lines 16—16 in FIG. 15.
Figure 15:
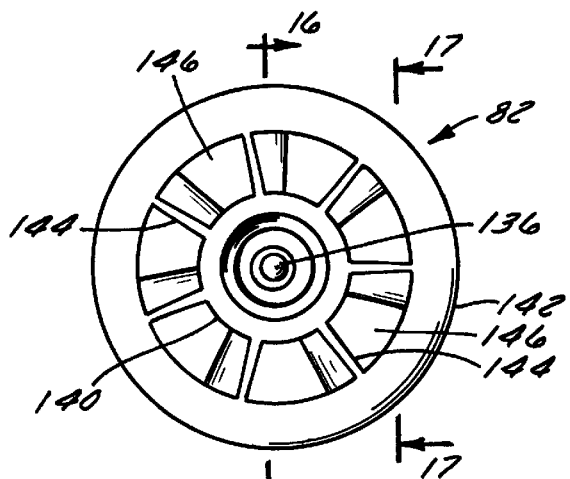
FIG. 15 is an end view of the turbine of the sensor assembly of FIGS. 5–7.
Figure 17:
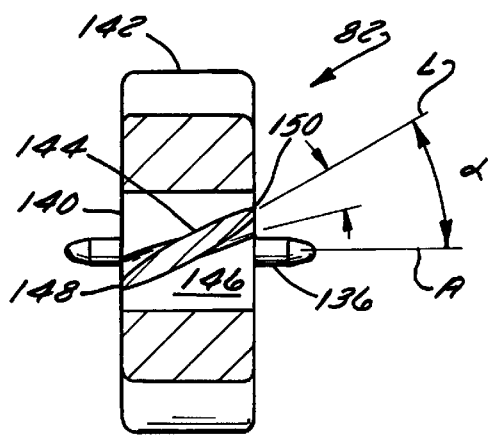
FIG. 17 is a sectional side elevation view taken along the lines 17—17 in FIG. 15.
Figure 18:
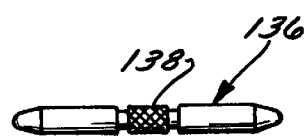
FIG. 18 is a side elevation view of the shaft for the turbine of FIGS. 15–17.

The turbine 82 is mounted in the turbine cartridge 80 by a shaft 136 that has opposed ends rotatably supported in the bearings formed by the apertures 120 and 134 in the flow straightener 110 and the exit cone 114, respectively. As best seen in FIGS. 16–18, the ends of shaft 136 are tapered to minimize the contact area between the axial ends of the shaft 136 and the bearings, hence minimizing friction between the shaft 136 and the bearings 120 and 134. The bearings 120 and 134 are lubricated and cooled by the flow of the monitored liquid through the turbine 82. This sort of integrated bearing construction is made possible in part by the close tolerances imposed on cartridge construction. As discussed above, these close tolerances are in turn made possible because all components of the turbine cartridge 80 are relatively small, thin walled, low friction plastic components.

The turbine 82 forms the heart of the flow meter 50. It is designed to require minimal torque to turn, to impart a very small pressure drop on liquids flowing therethrough, and to have a high degree of linearity over a relatively broad range of liquid flow rates therethrough. Meeting these criteria represented a significant design challenge with the greatest areas of difficulty being in blade design and magnet configuration. The manner in which these criteria were met by the present invention will be described after briefly describing the structure of the turbine 82.

Referring particularly to FIGS. 5, 6, and 15–18, the turbine 82 is a one piece molded magnetic element that includes a central circular hub 140, an outer annular ring 142, and a plurality (7 in the illustrated embodiment) of vanes or blades 144 extending outwardly from the hub 140 to the ring 142. The turbine 82 is approximately 0.19" long. The ring 142 has an outer diameter of 0.525" and a thickness of about 0.065". The hub has a diameter of about 0.220" so that an annular space 146, segmented by the blades 144, is formed between the hub 140 and the ring 142. The space 146 is about 0.09" thick As can best be seen in FIG. 17, the blades 144 extend through the space 146 at an acute angle αwith respect to the rotational axis A of the turbine 82. The geometry of the turbine 82 is symmetrical about a radial plane bisecting the turbine. This permits the turbine 82 to operate the same way no matter how it is inserted into the cartridge.

Optimizing the blade design proved instrumental to turbine design. The dimensions of the blades 144 relative to the dimensions of the hub 140 and the ring 142 and the number of blades 144 were selected to permit molding the turbine and to strike an acceptable compromise between low flow rate performance and high flow rate performance. Higher liquid velocities are preferred to permit low-pressure liquid streams to impart sufficient torque on the turbine 82 to turn it, but pressure drops increase with increases in velocity. High pressure drops at low operating pressures degrade filter assembly performance. The blade configuration therefore is designed to maintain flow linearity while minimizing pressure drop. That is, in many turbines, as flow rates through the turbine vary, so do the number of revolutions of the turbine per gallon of liquid flowing through it. The turbine 82 should preferably have a linear relationship with flow rates such that the rotational velocity of the turbine 82 varies linearly with flow rates through the turbine 82 so that, at any given volumetric flow rate within the flow meter's rated operational range of flow rates, the number of turbine revolutions per unit volume remains the same (note the curve 262 in FIG. 20, discussed in greater detail below). It has been found that blade length, width, and angle can be combined with hub width and ring width and optimized for maintaining linearity and minimizing pressure drop over the rated operating flow rate range.

The turbine 82 of the illustrated embodiment is designed for use in a residential water filtration system or other application having a desired operational flow rate range of from about 0.4 gallons per minute to 4.0 gallons per minute or more. The turbine 82 therefore is designed to maintain linearity over that range with minimal pressure drop. Towards these ends, the angle α at which the blades 144 extend from the axis A of the turbine 82 is set at an initial angle of 30° at the inside surface of the ring 142. This angle decreases progressively to a theoretical angle of 0° at the center of the hub 140 to compensate for the fact that tangential velocities decrease as one approaches the center of a rotating object. Changes of more than 5° from that selected initial 30° angle were found to create marked reductions in linearity.

As best seen in FIG. 17, the opposed side edges 148 and 150 of each of the blades 144 taper inwardly towards a lateral centerline L of the blade 144 such that each blade 144, when viewed in transverse cross-section, is generally elliptical in shape with a maximum thickness of about 0.031". It has been found that this tapered blade profile minimizes disruption of the inflowing liquid stream and helps promote laminar flow through the turbine 82. In addition, the elliptical profile is believed to act similarly to an air foil to help pull the turbine 82 around the turbine chamber 122 at low flow rates.

Choosing a material for the turbine 82 also proved important to the design. Prior known turbine configurations, such as that disclosed in the above-described Silverman patent, employed one or more discrete bar magnets as the turbine position indicator. More specifically, a bar magnet typically would be imbedded axially into the hub of the turbine on one side of the turbine's rotational axis, and either another magnet or a counterbalancing weight would be imbedded on the other side of the axis. This discrete magnet-type assembly exhibits several disadvantages.

For instance, the flux generated by the magnet interacts with the reed switch or other magnetic pick-up device to imposes a torque on the turbine that resists turbine rotation away from the pick-up device. Ideally, the flux generated by the magnet and the resulting torque should ramp or drop off gradually as the pole of the magnet moves away from the detector so as to reduce as much as possible this resistive torque. However, in a discrete magnet, flux drops off relatively quickly, resulting in relatively high resistance to turbine movement and inhibiting the ability of the flow meter to operate at low flow rates.

In addition, the flux lines from the magnet flow from the north end of the magnet radially around along the sides and into the opposite south end. At any given distance from the center of the surface of the magnet, there is a null area where the magnetic field is zero. This may result in two activations of the detector during each cycle of revolution of the turbine and hence in the recording of two pulses per turbine revolution. If one wishes to prevent multiple pulses from being counted when a conventional bar magnet is used as a position indicator, the magnet must be positioned off-center from the detector. In either event, use of a conventional bar magnet results in less than optimal operation of the detector.

It has been recognized previously that the problems associated with discrete magnets might be alleviated if a turbine having an integrated magnet could be developed. However, a suitable magnetic turbine heretofore was unavailable.

The problems associated with prior discrete magnet turbines have been overcome in the present invention through the development of a turbine 82 that is formed from a magnetic material that is magnetized in such a way that the north and south poles are located on the periphery of the ring 142 adjacent one another so that, when the juncture between the north and south poles is located adjacent the detector 84, flux lines flow directly outwardly from the north pole, through the detector 84, and back to the adjacent south pole with the flux dropping off gradually as the juncture between the poles moves away from the detector 84. Accordingly, only one pulse is recorded per turbine revolution, and resistive torques imposed on the turbine due to interaction between the detector 84 and the magnet are reduced.

In order to form a magnetic turbine meeting these requirements, the turbine 82 is formed from a molded plastic/magnetic powder composition and then sealed to prevent the magnetic powder from washing out of the turbine 82 during monitoring operations. The composite material includes a magnetic powder admixed with a polymer carrier. Trace amounts of a flow promoter, a processing agent, or another additive may also be added to the mixture as desired. Although several magnetic powders and polymer carriers are available, the preferred powder and carrier are neodymium iron boron and a high-flow nylon, respectively because this composition can be used to mold thin blades while still being capable of being magnetized as required. The preferred composition includes 25–60% by volume, preferably about 35% by volume, of neodymium iron boron, with nearly all of the remainder (except for the possible inclusion of trace amounts of additives referenced above) comprising high-flow nylon. Particle sizes of the magnetic powder may vary in size from 3 microns up to 420 microns with a preferred value of about 200 microns.

The turbine 82 is fabricated in a multi-step process. First, the magnetic powder and polymer carrier are mixed. The mixture is molded into the desired turbine shape via injection molding, casting, compression molding, or the like. The support shaft 136 is also molded in place during molding. (The shaft 136 preferably has a knurled central portion 138 to facilitate its retention in the turbine hub 140.)

After molding, a thin coating of a sealant may be applied to the turbine 82 to prevent the magnetic powder from leaching or washing into the monitored liquids. However, only very small quantities of powder leach or wash out of the turbine because most of the powder particles are fully encapsulated in the polymer carrier. Only those particles which are exposed to the turbine's surface are subject to leaching. Coating therefore is required only in those applications in which extreme purity of treated liquid is required. In those instances in which sealant application is desirable, a sealant known as Parylene-C, manufactured by Specialty Coating Systems of Indianapolis, Ind., is applied by vapor deposition. The deposited layer of the Parylene-C is extremely thin, on the order of 0.0003".

Then, the turbine 82 is magnetized via a conventional process so that its north and south poles extend generally peripherally and are located generally adjacent one another as described above.

The detector reed 84 comprises the final component of the sensor assembly 74. The detector could comprise a Hall-effect sensor or the like but preferably comprises a reed switch. The preferred reed switch includes a reed 152 that is mounted in a reed housing 154 and that is electrically connected to the cable 78 by wires 156. The reed is axially off-set from the center of the housing 154 as best seen in FIG. 7 so as to be located at a distance from the turbine 82 that optimizes magnetic interaction between the turbine 82 and the reed 152. The reed housing 154 is snap-fit into the detector housing 108 formed in the cartridge housing 86. The preferred reed switch 84 is manufactured by Hamlin Company and marketed under Model No. MDSR-7.

4. Construction Of Microcontroller/Indicator Assembly

Figure 19:
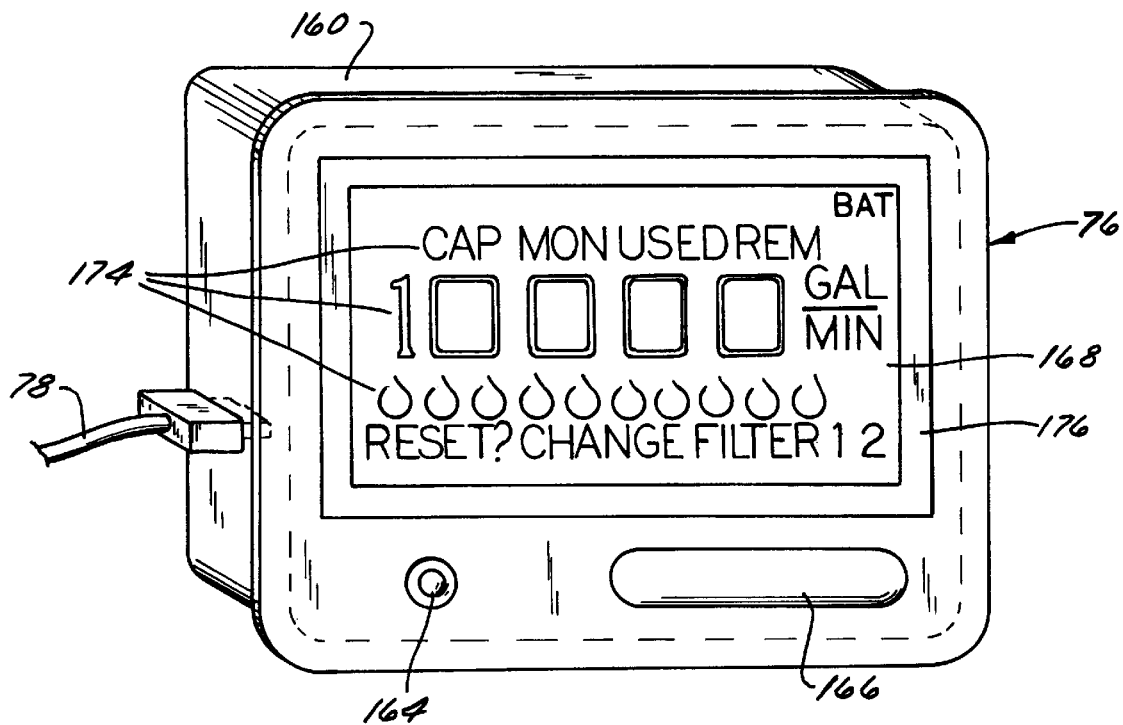
FIG. 19 is a perspective view of a microcontroller/indicator assembly of the liquid flow meter of FIGS. 1–4.

The microcontroller/indicator assembly 76 includes circuitry, controls, and displays for performing calculations based upon signals received from the sensor assembly 74 and for displaying relevant information concerning liquid flow. Referring to FIGS. 4 and 19, the assembly 76 is encased in a housing or casing 160 that may be mounted at a location remote from the sensor assembly 74. In the illustrated embodiment, the housing 160 is mounted in the upper section 64 of the base 56 of the filter assembly 52 as described above. The microcontroller/indicator assembly 76 includes a computer or microcontroller 162, a RESET button 164, a DISPLAY button 166, an audio alarm 168, and a visual indicator 170 all supplied with power by a power source 172 which also supplies power to the reed switch 84. It may also contain one or more drivers for external displays—an important feature in some applications in which the filtration system is located in a relatively non-accessible location. Due to the low power requirements of the flow meter 50, the power source may comprise a battery of about 3.0 volts or even less. The cable 78 completes the assembly 76 and, as discussed above, is connected to the reed switch 84 as seen in FIGS. 2 and 7 and plugged into the casing 160 as best seen in FIG. 19 to transmit signals between the reed switch 84 and the remainder of the assembly 76.

The computer or microcontroller 162 may include a conventional microprocessor which operates with one or more counters and one or more timers of the microcontroller or may comprise any other device capable of determining volumetric flows by counting pulses from the detector 84. Microcontroller 162 also includes drivers for selectively illuminating the visual indicator 170 to illuminate one or more of the elements 174 seen on face 176 of the housing 160 in FIG. 19. This visual indicator 170 preferably comprises one or more LCDs but could comprise one or more LEDs or the like.

Referring now to FIGS. 22–25, the microcontroller 162 is programmed to count pulses delivered by the reed switch 84 and to calculate and to at least selectively display 1) information concerning the aggregate volume of liquid that has flowed through the flow meter 50 since counting began, 2) the flow rate of liquid through the flow meter 50, and 3) information concerning the elapsed time since timing began. The routines for performing these functions will now be detailed with reference to FIGS. 22–25.

All of the following discussions relate to a flow meter designed for use with potable water filtration systems designed for household use. However, the flow meter 50 could be adapted to operate in markedly different installations with no changes to the sensor assembly 74 and with only minor changes to the display and calculation capabilities of the microcontroller/indicator assembly 76.

Figure 23:
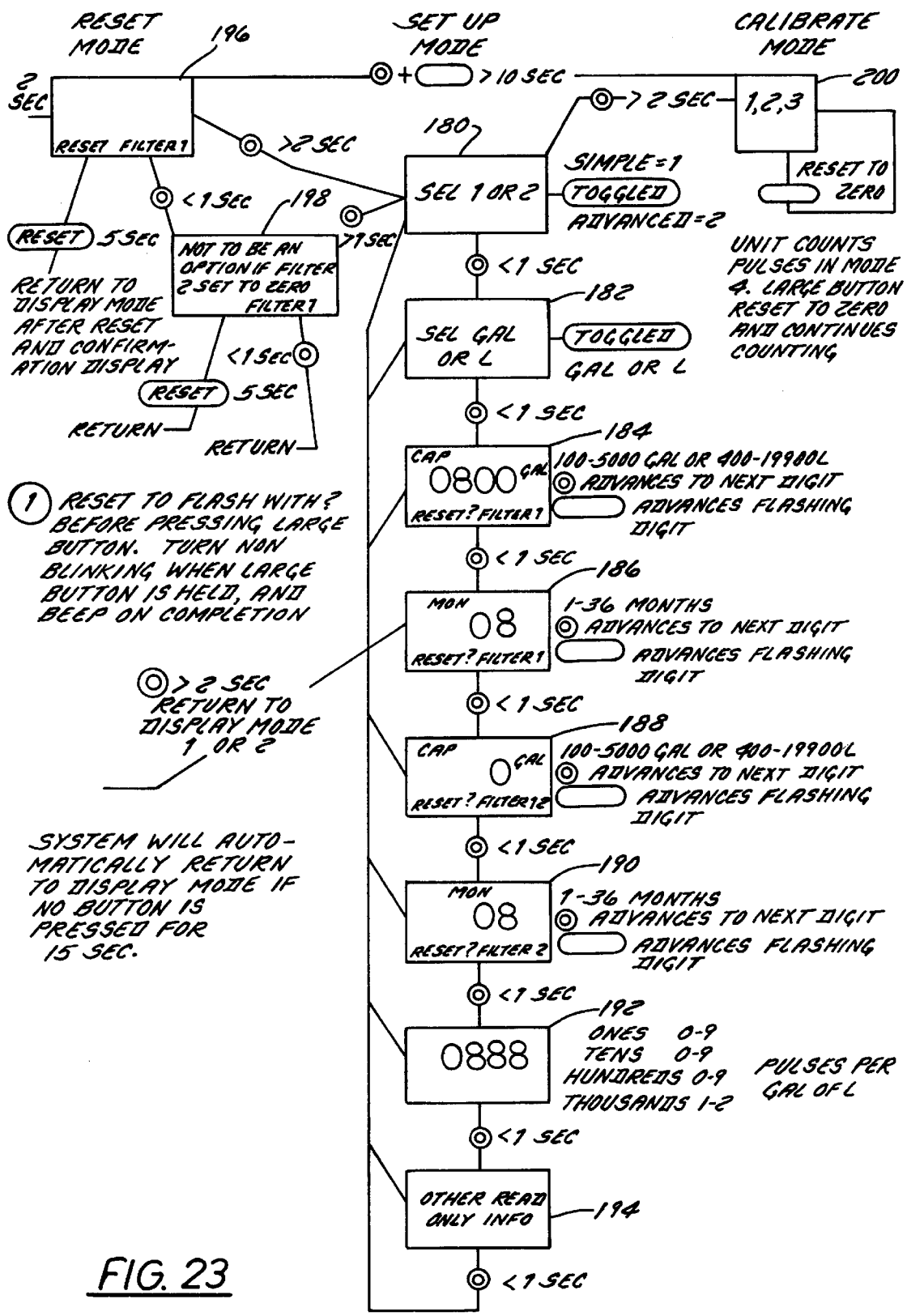

The flow meter 50 is first set-up for use with a desired filtration system by placing the microcontroller/indicator assembly 76 in a SET-UP mode using the procedure illustrated in FIG. 23. The SET-UP mode capability permits the liquid flow meter 50 to be programmed for use in filtration systems having either one or two filter cartridges and permits the liquid flow meter 50 to be used with filtration systems incorporating filter cartridges having different rated lives (both in time and in volumetric capacity) and even in two-filter cartridge filtration systems in which each of the two filter cartridges has a different rated life. Programming requires only the toggling of the RESET and DISPLAY buttons 164 and 166 in designated sequences. (The RESET button 164 is illustrated by concentric circles in the drawings, and the DISPLAY button 166 is illustrated by an ovoid structure).

Specifically, referring to FIG. 23, the buttons 164 and 166 can be used to set the flow meter 50 to monitor either one or two filter cartridges, to set the assembly 76 to display in either a BASIC display mode or an ADVANCED display mode (block 180); to set the LCD to display volumes in either gallons or liters (block 182); to set a rated volumetric capacity of from 100 gallons to 5,000 gallons for each filter cartridge to be monitored (blocks 184 and 188); and to set a rated life of from 1–36 months for each filter cartridge to be monitored (blocks 186 and 190). "Zero" values are input in blocks 188 and 190 for one-filter cartridge systems to disable display of information about a second filter cartridge. Finally, the pulses (or detected turbine revolutions) per gallon or liter and any other necessary read-only information required to calculate volumes and flow rates are also input in blocks 192 and 194, respectively. In order to assist manufacturer evaluation of used assemblies, this read-only information may include 1) total gallons that have flowed through the sensor, regardless of RESET operations, 2) total time that the sensor has been in operation, regardless of RESET operations, and 3) the number of RESET operations. The specifics of this SET-UP operation are believed to be self-evident from FIG. 23 and, accordingly, will not be described in further detail.

FIG. 23 also illustrates that the liquid flow meter 50 can be operated in a RESET mode. The RESET procedure performed by manipulating the buttons 164 and 166 in this mode is used to reset the microcontroller's counter and timer at initial filtration system installation or upon each incidence of filter cartridge replacement. The details of the RESET mode are believed to be self evident from blocks 196 and 198 in FIG. 23 and, accordingly, will not be detailed.

It is also possible at this time to use the RESET and DISPLAY buttons 164 and 166 in conjunction with one another to enter a CALIBRATE mode. When in this mode, the flow meter 50 can be calibrated to monitor flow of liquids of different, previously unknown viscosities in a very simple process. All that is required is to cause a designated, previously-known volume of the liquid to be calibrated to flow through the sensor assembly 74 while the number of pulses obtained for that volume are counted and stored in the microcontroller's memory. That information is all that is required to obtain the desired information regarding pulses per unit volume. To obtain optimal results in those applications in which higher-than-normal accuracy is required, the volume, temperature, and duty cycle under which the sample liquid is measured should occur under conditions similar to those projected to prevail under normal use of that liquid.

Before the specific display functions of the microcontroller/indicator assembly 76 are described in detail, the basic calculations performed by the microcontroller 162 will be detailed. As discussed above, whenever water or another liquid to be monitored flows through the turbine 82, the reed switch 84 and microcontroller 162 count one pulse for each turbine revolution. It is then a simple matter for the controller 162 to divide the number of counted pulses by the previously-stored pulses per gallon (either input in block 192 in FIG. 23 or determined during the CALIBRATE mode in block 200 and then input in block 192) to obtain an indication of the volume of liquid flowing through the sensor assembly 74. A running tally of the counted volume can then be used to store the aggregate volume of liquid that has flowed through the filter assembly 52 since the last RESET procedure. The counted pulses can also be used in conjunction with the timer to calculate the liquid flow rate through the liquid flow meter 50. The timer can also be used keep track of the total time since installation of the filter cartridge, i.e., since the last RESET procedure.

Figure 24:
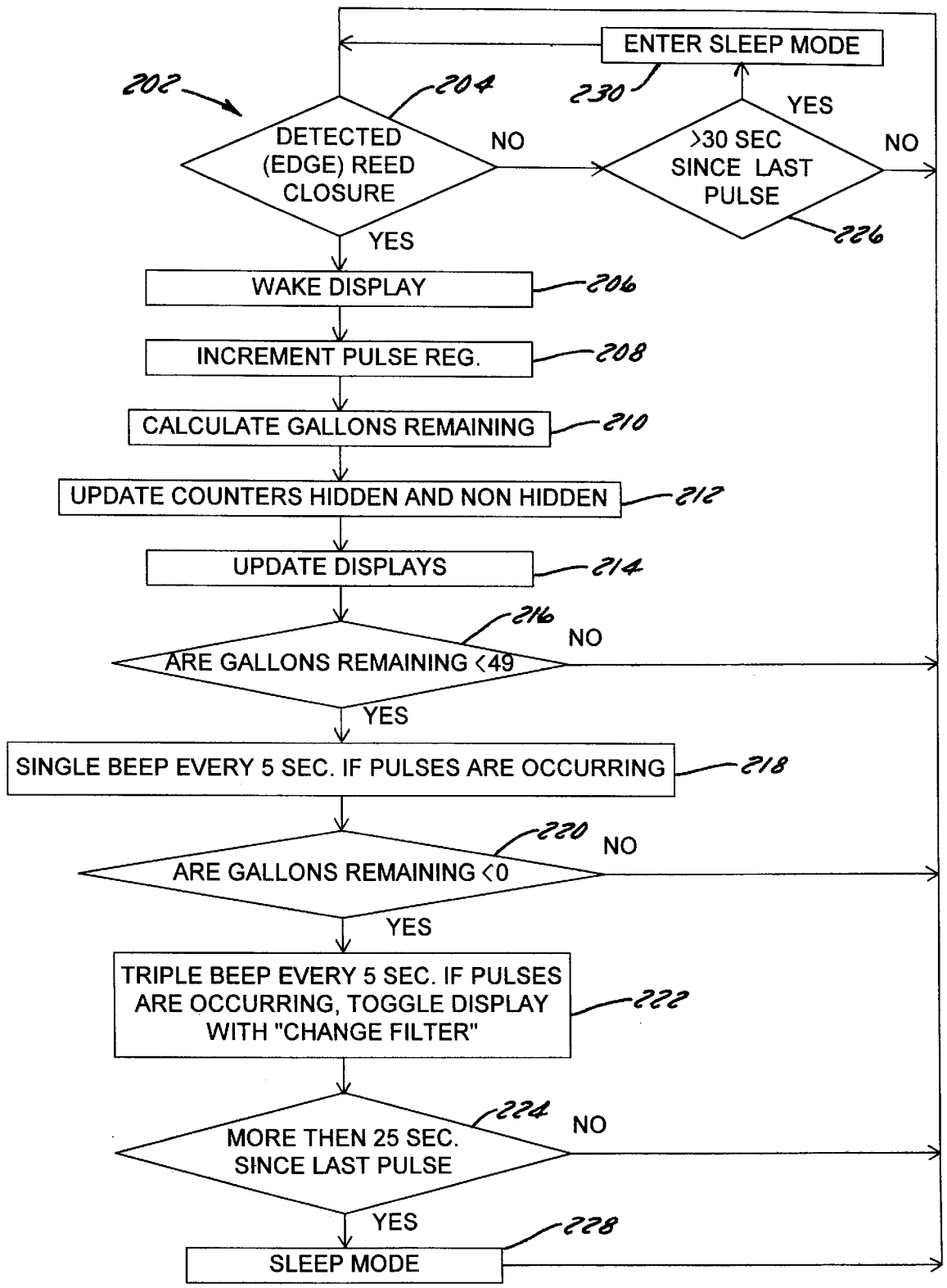

The specifics of some of the operations of the microcontroller 162 that can be performed based upon the above-described determinations will now be detailed with reference initially to the routine 202 of FIG. 24. Routine 202 illustrates that, whenever the filtration system 54 is not operating, i.e., when there is no liquid flowing through the filter assembly 52 for a designated period of time, the microcontrolled/indicator assembly 76 enters a SLEEP mode in which no LCDs or audio alarms are energized. Operation in this mode not only conserves battery power, but also instills confidence with the user that the flow meter 50 is operating. That is, the readings of some of the displays such as remaining gallons change only relatively infrequently. Users who do not witness any changes in display status for relatively long periods may begin to wonder whether or not the flow meter is operating properly. The wake-up procedure provides the desired display changes and informs the user that the flow meter is operating.

When the reed switch 84 detects a pulse in block 204, thereby indicating that liquid is beginning to flow through the flow meter 50, the displays are woken or activated in block 206 and the pulse registered in block 208. The microcontroller 162 then calculates the remaining useful volumetric capacity of the filter cartridge or cartridges in block 210 by subtracting the determined aggregate volume of liquid that has flowed through the liquid flow meter 50 since the last RESET operation from the previously-stored rated volumetric capacity. It then updates all counters and displays in blocks 212 and 214. In inquiry block 216, the routine 202 determines whether or not the determined volume is less than a designated volume (49 gallons in the illustrated embodiment) less than the filter cartridge's rated volumetric capacity as stored in the memory of the microcontroller 162 during the SET-UP procedure. If not, the routine 202 returns to inquiry block 204. If so, the microcontroller 162 energizes the audio alarm 168 in block 218 to beep cyclically (so long as pulses are being detected), and then inquires in block 220 whether or not the entire rated volumetric capacity of the filter cartridge has been used. If not, the routine 202 returns to inquiry block 204. If so, the frequency of the audio alarm's beeps are increased in block 222 for the duration of fluid flow and a "change filter" display is illuminated in the LCD display 170.

At some point, the flow of liquid through the filtration system 54 will cease, at which point the reed switch 84 will no longer generate pulses. If the reed switch 84 does not generate a pulse for more than a designated amount of time (either 25 seconds in block 224 or 30 seconds in block 226), the routine 202 will reenter SLEEP mode as seen in blocks 228 and 230.

Figure 25:
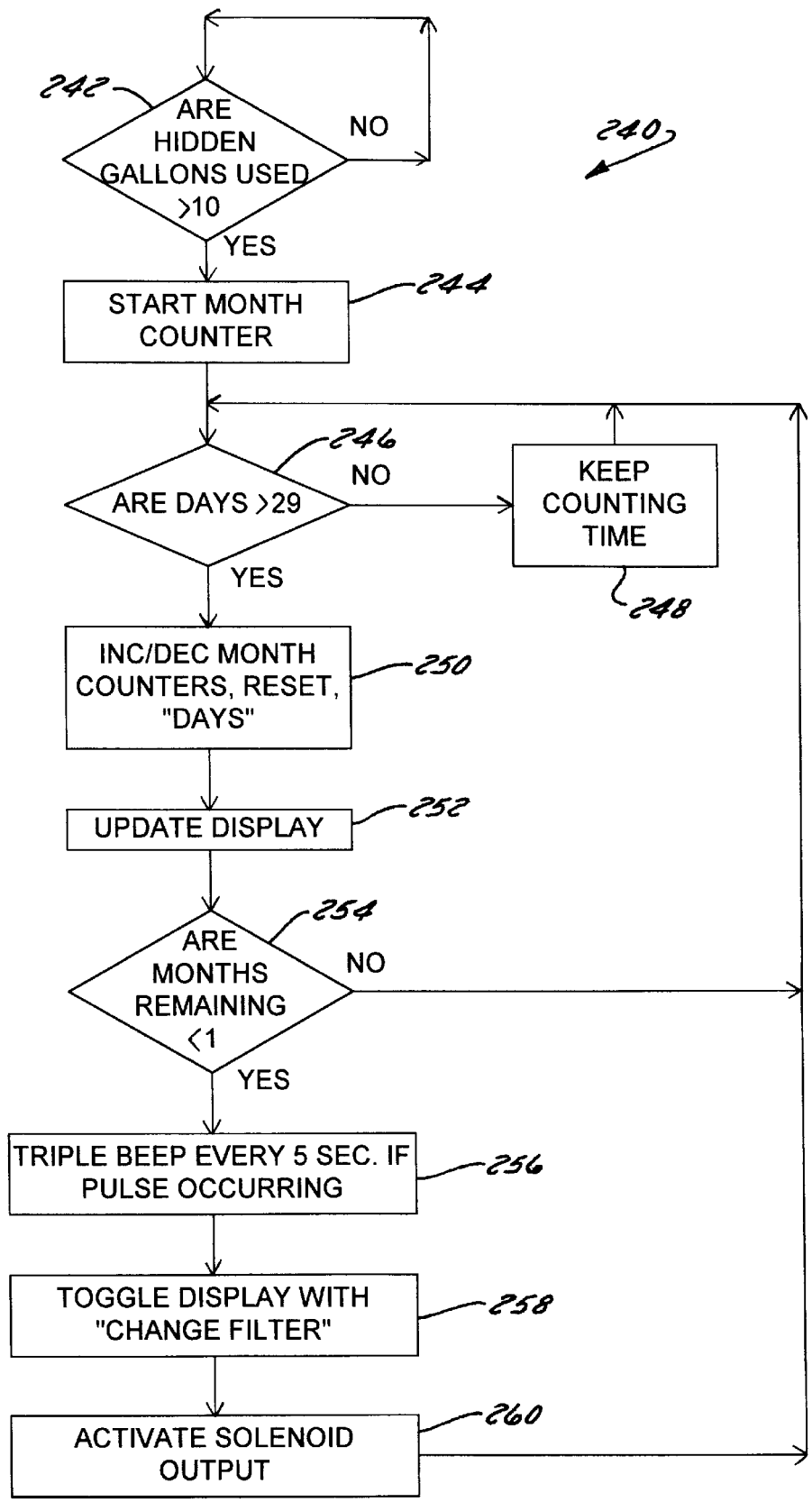

The microcontroller 162 preferably also is designed to compare the time since the filter cartridge was installed, i.e., since the last RESET operation, with a designated time indicative of the rated useful life of the filter cartridge. A routine 240 suitable for these operations is illustrated in FIG. 25. Routine 240 proceeds from start to block 242 in which it prevents a month counter (block 244) from starting unless more than 10 gallons of liquid has flowed through the flow meter 50 since initial filtration system installation (this function is not reset by a RESET operation). This subroutine prevents the month counter from running before the filtration system 50 has been installed and operated. Then, the routine 240 determines in inquiry block 246 whether or not more than 29 days (indicative of a month) has expired since the month counter has started. If not, the routine 240 proceeds to block 248 where it keeps counting time. If so, the month counter display is decremented in block 250, the "DAYS" are reset, and the displays are updated in block 252. Then, in block 254, the routine 240 determines whether or not the months remaining, i.e., the rated useful life minus the calculated number of months since the last RESET operation, is less than one. If not, the routine 240 returns to block 246. If so, blocks 256 and 258 trigger the audio alarm 168 and flashing of a "change filter" display in the LCD 170, and a solenoid output (used, for example, to trigger a shut-off valve) may be activated in block 260. The routine 240 then returns to block 246.

Day-to-day interactive operation of the liquid flow meter 50, including operation of the sensor and microcontroller/indicator assemblies 74 and 76, will now be detailed.

5. Operation Of Liquid Flow Meter

Figure 3:
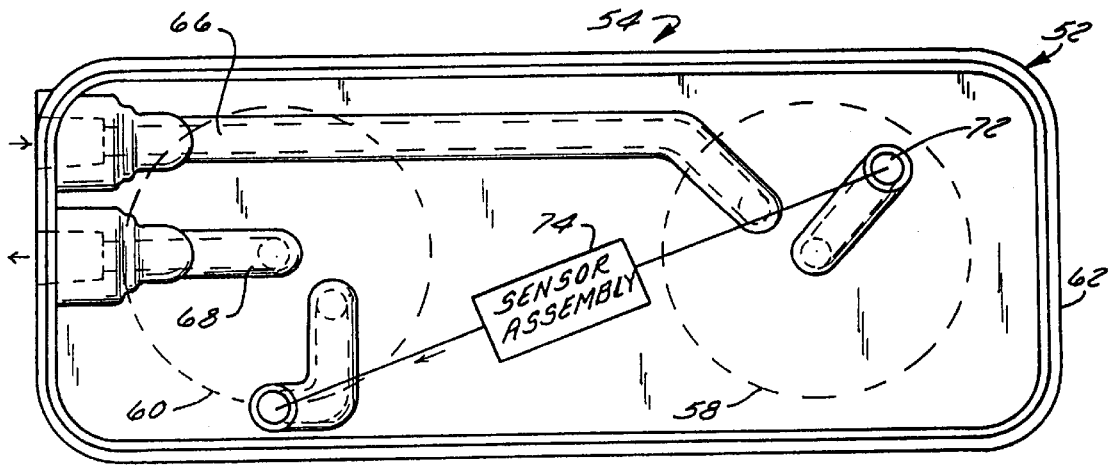
FIG. 3 is a partially schematic, cut-away top plan view of the filtration system of FIGS. 1 and 2.

Assuming that the filtration system 54 has been installed, calibrated, set-up, and reset, the microcontroller/indicator assembly 76 is placed in the SLEEP mode by routine 202 in the absence of liquid flow through the sensor assembly 74. When liquid begins to flow through the sensor assembly 74, i.e., from the first stage filter cartridge 58 to the second stage filter cartridge 60 as illustrated in FIGS. 1–3, liquid flow through the turbine 82 causes it to rotate. Turbine rotation results in the reed switch 84 and microcontroller 162 counting a number of pulses that increments directly with the volume of liquid flow through the sensor assembly 74. The microcontroller 162 then calculates aggregate liquid flow, liquid flow rate, time remaining, and volume remaining as detailed above.

Figure 20:
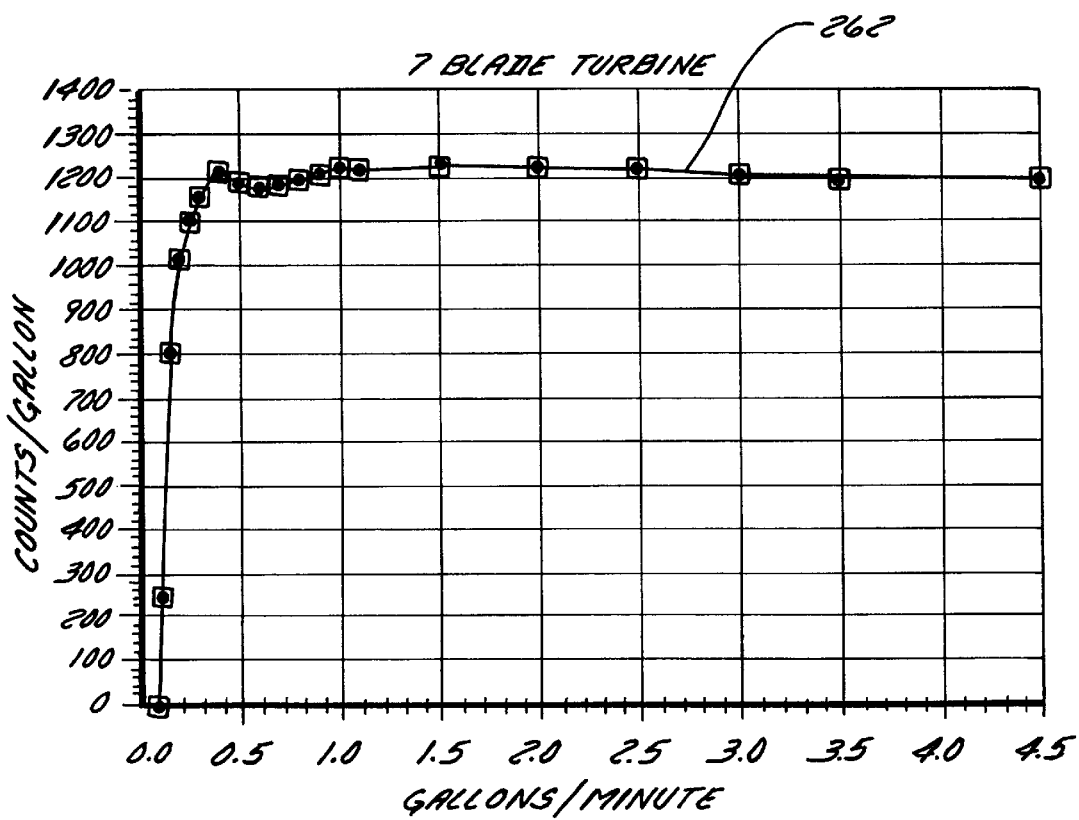
FIG. 20 is a graph of gallons per minute verses counts per gallon resulting from operation of the liquid flow meter of FIGS. 1–4.

As best seen by the curve 262 in FIG. 20, the design of the turbine 82 as detailed in Section 4 above assures linear operation so long as the flow rate of liquid through the sensor assembly 74 is between about 0.4 gallons per minute and 4.0 or even more gallons per minute. This 10:1 range of linearity is significantly higher than any other known flow meter. It has also been found that this 10:1 range of linearity is maintained even if different turbine geometries are selected to impose a different lower or upper end on the range of linearity.

Figure 21:
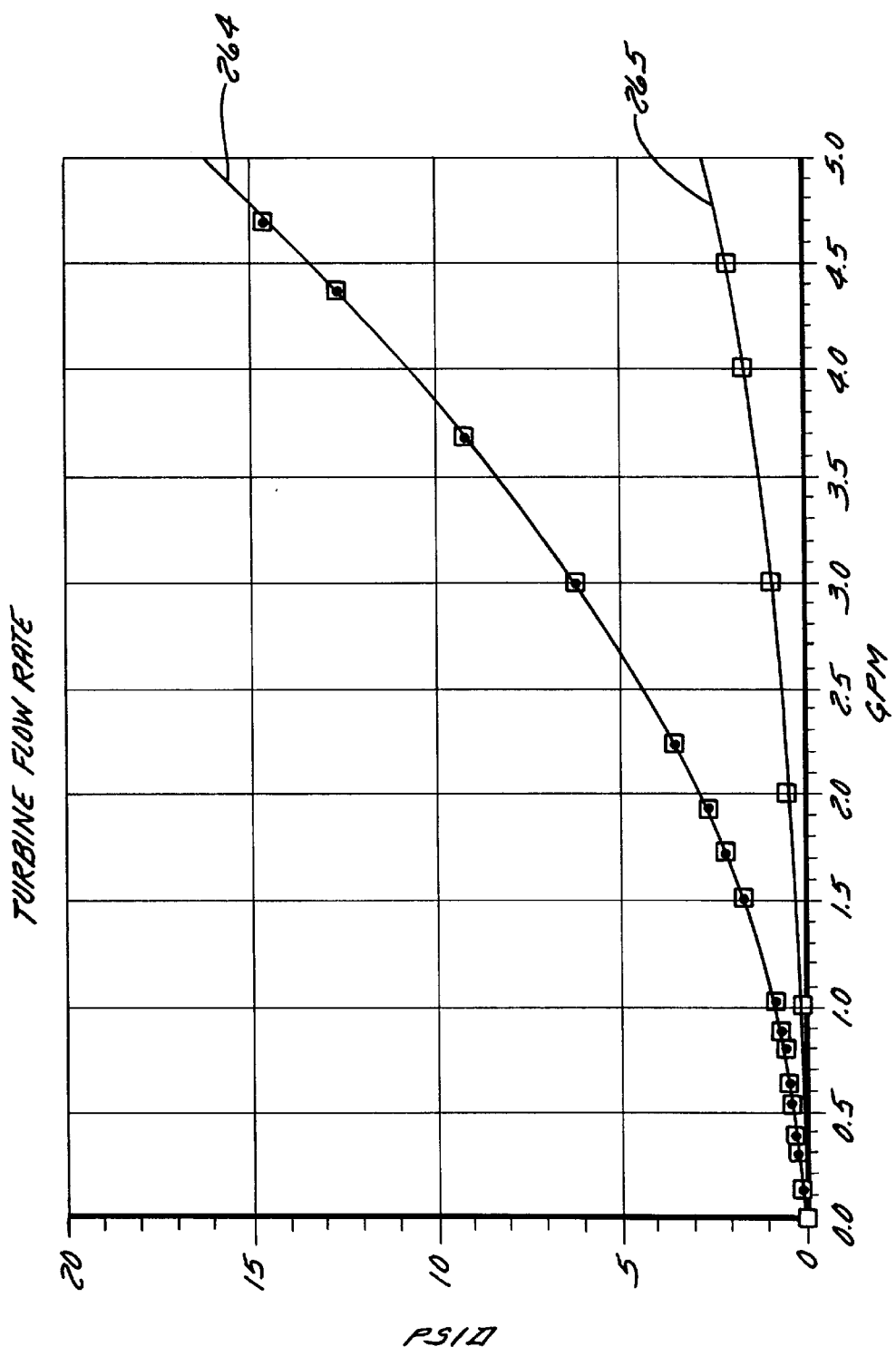
FIG. 21 is a graph of flow rate in gallons per minute verses pressure drop in pounds per square inch of the turbine of FIGS. 15–17.

The pressure drop occurring across the turbine 82 during operation is very small for the rated range of the liquid flow meter 50. Indeed, most of the pressure drop occurring during fluid flow through the flow meter 50 results from head losses in the turbine cartridge 80 and in the upstream and downstream sections of the tube 72 rather than from operation of the turbine. This fact can be demonstrated by comparing pressure drops in an arrangement in which the turbine cartridge 80 is fed with water by a relatively small diameter tube to an arrangement in which the turbine cartridge 80 serves as the only enclosed stream for the monitored liquid. Hence, curve 264 in FIG. 21 illustrates that the pressure drop through the assembly is less than about 2.7 psi at a flow rate of 2.0 gallons per minute and less than 0.4 psi at a flow rate of 0.4 gallons per minute when the turbine cartridge 80 is connected to upstream and downstream sections of tubing having an ID of 0.25" (even these pressure drops are substantially less than those found in the arrangement described in the Silverman patent and other previously available arrangements). Curve 265 demonstrates that these pressure drops fall dramatically when flow occurs though tubing having an ID of 0.56" (the effective ID of the turbine cartridge) ranging about 0.5 psi at a flow rate of 2.0 gallons per minute to a negligible amount of less than 0.1 psi at a flow rate of 0.4 gallons per minute.

Figure 22:
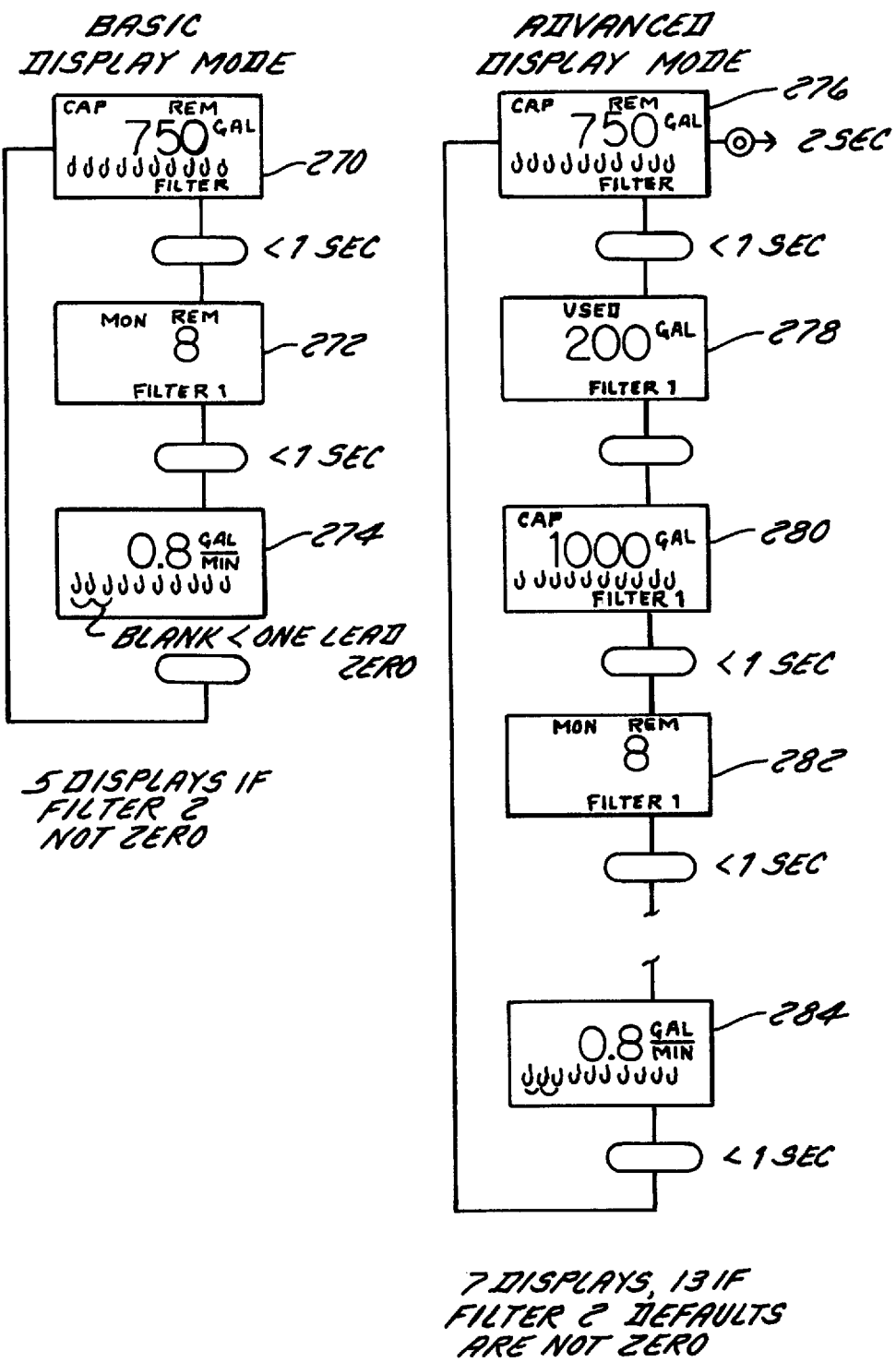
FIGS. 22–25 are flow charts of the display and calculation logic used by the microcontroller of the liquid flow meter of FIGS. 1–4.

The determined information can be displayed as desired by toggling the DISPLAY button 166 as illustrated in FIG. 22. The number of displays that are available depend upon whether the microcontroller/indicator assembly 76 is set-up to display in the BASIC display mode or in the ADVANCED display mode (see the description of FIG. 23 in Section 4 above). In either mode, the assembly 76 initially displays the remaining volumetric capacity of the filter cartridge, both by displaying a numerical value and by illuminating a number of water droplets that decreases with deceasing remaining capacity of the filter cartridge (see blocks 270 and 276). In the BASIC display mode, toggling the DISPLAY button 166 once will cause the assembly 76 to display the remaining rated life of the monitored filter cartridge in months (block 272), and toggling the DISPLAY button 166 again will cause the assembly 76 to indicate liquid flow rate through the sensor assembly 74 both by the display of a numerical value and by the scrolled filling of the water droplets (see block 274). The rate of scrolling is proportional to the flow rate of liquid through the flow meter 50. If the ADVANCED mode is chosen during set-up, successive toggling operations will trigger display of used volumetric capacity, the rated volumetric capacity of the filter cartridge, the remaining rated useful life of the filter cartridge in months, and liquid flow rate, respectively (see blocks 278, 280, 282, and 284, respectively).

The above-described display operation assumes that the microcontroller/indicator assembly 76 is set-up to monitor a one-filter cartridge filtration system. If the assembly is set-up to monitor a two-filter cartridge filtration system, additional toggling operations will trigger displays relating to the second filter cartridge of the system.

It can thus be seen that the liquid flow meter 50 is relatively simple, compact, and versatile and yet precisely monitors liquid flow over a wide operational flow-rate range with minimal pressure drops and minimal power consumption. Of course, many changes and modifications could be made to the liquid flow meter 50 without departing from the spirit of the present invention. Some changes will now be detailed.

6. Alternative Configurations

As discussed above, one of the advantages of the turbine cartridge 80 is that it is easily adapted for use in a wide variety of systems. For instance, rather than being inserted in a separate housing between two cartridges of a multi-cartridge filter assembly as illustrated in FIGS. 1–3, it could be incorporated directly into a filter assembly having a relatively rigid base such as the countertop filter assembly 352 of the filtration system 354 seen in FIG. 26. The filter assembly 352 includes a base 356 configured for mounting on a countertop 353 and a single filter cartridge 358 extending upwardly from the base 356. Raw water is supplied to the filter assembly 352 from a supply tube (not shown), and treated water is discharged from the filter assembly 352 by a spigot 368 that is connected to the outlet of the filter cartridge 358 by an internal passageway 357 in the base 356. It is in this internal passageway 357 that the turbine cartridge 82 of the liquid flow meter 50 is inserted. This sensor assembly differs from the sensor assembly 74 discussed above only in that it lacks a cartridge housing. Rather, support for the turbine cartridge 80 is provided by the walls of the passageway 357 in which the turbine cartridge 80 is inserted. The reed switch (not shown) is mounted either in the base 356 adjacent the turbine 82 as in the first embodiment.

The only other variation of the filtration system 354 of the second embodiment as compared to the first embodiment is a reorientation of the microcontroller/indicator assembly 76 such that the assembly 76 is upright when the filter assembly 354 is supported on the countertop 353 as illustrated.

Another modification to the flow meter may constitute the use of a slightly different turbine 382 as illustrated in FIGS. 27 and 28. Turbine 382 is designed to facilitate use of the flow meter in applications in which linearity of measurement is desired at flow rates of as low as 0.2 gallons per minute or less (as are found in many countries other than the United States). This turbine 382 has the same components as the turbine 82 of the first embodiment. These components therefore are designated by the same reference numerals, incremented by 300. The turbine 382 differs from the turbine 82 of the first embodiment only in that 1) it has a thicker hub 440 and hence a smaller annular space 446 between the hub 440 and the ring 442, and 2) its blades 444 extend at a different angle. Specifically, the hub 440 has a diameter of 0.320" as opposed to the 0.220" diameter of the hub 140 of the turbine 82 of the first embodiment, and the annular space 446 therefore has a diameter of 0.04" as opposed to 0.09" as in the previous embodiment. The smaller annular space 446 increases the liquid flow velocity through the turbine 382 and hence permits relatively slow-flowing liquids to generate enough torque to rotate the turbine 382. Torque is increased further by increasing the initial angle a of blade pitch from 30° to 36°. The use of a smaller space 446 and more steeply-pitched blades necessarily results in a higher pressure drop across the turbine. However, as demonstrated above with respect to FIG. 21, this pressure drop is still much smaller than pressure drops due to head losses in other components of the flow meter.

Many other changes and modifications could be made to the invention without departing from the spirit thereof. The scope of these changes will become apparent from the appended claims.

We claim:

1. A filtration system comprising:
   (A) a filter assembly having a raw liquid inlet and a treated liquid outlet; and
   (B) a flow meter which monitors the flow of liquid through said filter assembly, said flow meter including
      (1) a turbine configured to rotate under the force of liquid flowing therethrough, said turbine being made substantially entirely out of a magnetic material, wherein said magnetic material comprises a molded composite material comprising a magnetic powder admixed with a carrier,
      (2) protector which monitors movement of said turbine, and
      (3) a computer which receives signals from said detector and which generates a signal indicative of liquid flow through said turbine.

2. A filtration system as defined in claim 1, wherein said detector comprises a reed switch.

3. A filtration system as defined in claim 1, further comprising an indicator which receives signals from said computer and which displays information indicative of liquid flow through said filter assembly.

4. A filtration system as defined in claim 3, wherein said indicator includes a liquid crystal display.

5. A filtration system as defined in claim 3, wherein said computer includes a timing circuit and a counter, wherein said computer calculates aggregate volumetric flow through said filter assembly and at least one of volumetric flow rate and elapsed time, and wherein said indicator displays at least one of remaining volumetric capacity, volumetric flow rate, and remaining useful life of said filter assembly.

6. A flow meter as defined in claim 1, wherein said flow meter further comprises a generally cylindrical turbine cartridge, and wherein said turbine is mounted in said turbine cartridge so as to rotate about an axis of rotation that is parallel to an axial centerline of said turbine cartridge.

7. A filtration system as defined in claim 6, wherein said turbine comprises
   a central hub rotatably mounted in said turbine cartridge;
   a cylindrical outer ring; and
   a plurality of blades extending outwardly from said hub to said ring, each said blade extending at an acute angle with respect to said axis of rotation.

8. A filtration system as defined in claim 7, wherein said flow meter further comprises a shaft for rotatably supporting said turbine in said turbine cartridge, said shaft extending axially through said hub of said turbine and terminating in opposite ends which are rotatably received in bearings of said turbine cartridge.

9. A filtration system as defined in claim 8, wherein ends of said shaft are inwardly-tapered, and wherein said bearings comprise apertures formed in axial-extending posts of said turbine cartridge.

10. A filtration system as defined in claim 6, wherein said turbine cartridge comprises at least first and second generally cylindrical sections cooperating with one another such that each of said first and second sections rotatably supports one end of said turbine.

11. A filtration system as defined in claim 10, wherein each of said cylindrical sections has an annular outer wall having a maximum thickness of less than 0.15".

12. A filtration system as defined in claim 11, wherein the outer wall of at least one of said cylindrical sections has a maximum thickness of less than 0.063".

13. A filtration system as defined in claim 10, wherein said turbine cartridge further comprises a third generally cylindrical section that is disposed between and attached to said first and second generally cylindrical sections and that surrounds said turbine.

14. A filtration system as defined in claim 10, wherein each of said first and second cylindrical sections includes an axially-extending post that rotatably supports an end of a shaft extending through said turbine.

15. A filtration system as defined in claim 6, wherein said filter assembly has a base and a filter cartridge mounted on said base, wherein said flow meter further comprises an elongated housing, wherein said turbine cartridge is disposed in said housing such that an inner peripheral wall of said housing supports said turbine cartridge and prevents said turbine cartridge from leaking, and wherein a mount is disposed on an exterior wall of said housing for supporting said detector.

16. A filtration system as defined in claim 15, wherein said base is configured for mounting beneath a countertop and said filter cartridge is configured to extend downwardly from said base.

17. A filtration system as defined in claim 16, wherein said housing includes 1) a body having an upstream end and a downstream end and 2) a cap attached to said downstream end of said body, wherein said turbine cartridge is disposed in a bore extending longitudinally through said body, and wherein a portion of said bore, located between said upstream end of said body and said turbine cartridge, increases continuously in diameter from an upstream end of said portion to a downstream end of said portion.

18. A filtration system as defined in claim 15, wherein said filter cartridge is a first filter cartridge and said filter assembly further comprises a second filter cartridge mounted on said base and configured to extend downwardly from said base, wherein said first housing has opposed ends connected to respective sections of a tube that connects said first filter cartridge to said second filter cartridge.

19. A filtration system as defined in claim 6, wherein said filter assembly includes a base and a filter cartridge mounted on said base, wherein said base has an internal passageway molded therein, and wherein said turbine cartridge is mounted in said internal passageway such that a peripheral wall of said passageway supports said turbine cartridge and prevents said turbine cartridge from leaking.

20. A filtration system as defined in claim 19, wherein said base is configured to rest on a countertop and said filter cartridge is configured to extend upwardly from said base.

21. A filtration system as defined in claim 1, wherein said carrier is a polymer carrier.

22. A filtration system comprising:
(A) a filter assembly having a raw liquid inlet and a treated liquid outlet; and
(B) a flow meter which monitors the flow of liquid through said filter assembly, said flow meter including
  (1) a turbine configured to rotate under the force of liquid flowing therethrough, said turbine being made substantially entirely out of a magnetic material, wherein said turbine comprises
    a central hub rotatably mounted in a generally cylindrical turbine cartridge so as to have an axis of rotation that is at least generally parallel to an axial centerline of said turbine cartridge;
    a cylindrical outer ring; and
    a plurality of blades extending outwardly from said hub to said ring, each said blade extending at an acute angle with respect to said axis of rotation, wherein each said blade has opposed side edges which taper inwardly towards a lateral centerline of said blade such that each said blade, when viewed in transverse cross-section, is generally elliptical in shape
  (2) a detector which monitors movement of said turbine, and
  (3) a computer which receives signals from said detector and which generates a signal indicative of liquid flow through said turbine.

23. A filtration system comprising:
(A) a filter assembly having a raw water inlet and a treated water outlet; and
(B) a flow meter which monitors the flow of water through said filter assembly, said flow meter including
  (1) a generally cylindrical turbine cartridge,
  (2) a turbine mounted in said turbine cartridge so as to rotate about an axis of rotation that is parallel to an axial centerline of said turbine cartridge as liquid flows axially through said turbine, said turbine being made entirely out of a magnetic molded material and being configured such that its rate of rotation increases linearly with water flow rate therethrough through a flow rate range of at least 3:1, wherein said magnetic material comprises a molded composite material comprising a magnetic powder admixed with a polymer carrier,
  (3) a detector which monitors movement of said turbine,
  (4) a computer which receives signals from said detector and which generates a signal indicative of the aggregate volume of water flow that has flowed through said turbine cartridge, and
  (5) an indicator which receives signals from said computer and which displays information relating to the aggregate volume of water that has flowed through said filtration system.

24. A filtration system comprising:
(A) a filter assembly having a raw water inlet and a treated water outlet; and
(B) a flow meter which monitors the flow of water through said filter assembly, said flow meter including
  (1) a generally cylindrical turbine cartridge,
  (2) a turbine mounted in said turbine cartridge so as to rotate about an axis of rotation that is parallel to an axial centerline of said turbine cartridge as liquid flows axially through said turbine, said turbine being made entirely out of a magnetic molded material and being configured such that its rate of rotation increases linearly with water flow rate therethrough through a flow rate range of from about 0.4 gallons per minute to about 2.0 gallons per minute, wherein said magnetic material comprises a molded composite material comprising a magnetic powder admixed with a polymer carrier,
  (3) a detector which monitors movement of said turbine,
  (4) a computer which receives signals from said detector and which generates a signal indicative of the aggregate volume of water flow that has flowed through said turbine cartridge, and
  (5) an indicator which receives signals from said computer and which displays information relating to the aggregate volume of water that has flowed through said filtration system.

25. A filtration system comprising:
(A) a filter assembly having a raw water inlet and a treated water outlet; and
(B) a flow meter which monitors the flow of water through said filter assembly, said flow meter including
  (1) a generally cylindrical turbine cartridge,
  (2) a turbine mounted in said turbine cartridge so as to rotate about an axis of rotation that is parallel to an axial centerline of said turbine cartridge as liquid flows axially through said turbine, said turbine being made entirely out of a magnetic molded material and being configured such that its rate of rotation increases linearly with water flow rate therethrough through a flow rate range of from about 0.2 gallons per minute to about 1.5 gallons per minute, wherein said magnetic material comprises a molded composite material comprising a magnetic powder admixed with a polymer carrier,
  (3) a detector which monitors movement of said turbine,
  (4) a computer which receives signals from said detector and which generates a signal indicative of the aggregate volume of water flow that has flowed through said turbine cartridge, and (5) an indicator which receives signals from said computer and which displays information relating to the aggregate volume of water that has flowed through said filtration system.

26. A flow meter comprising:

(A) a generally cylindrical turbine cartridge;

(B) a turbine mounted in said turbine cartridge so as to rotate about an axis of rotation that is parallel to an axial centerline of said turbine cartridge, said turbine being made substantially entirely out of a magnetic material, wherein said magnetic material comprises a molded composite material comprising a magnetic powder admixed with a carrier;

(C) a detector which monitors movement of said turbine and which generates a signal indicative of liquid flow through said turbine; and (D) an indicator which is electronically coupled to said detector and which displays information indicative of liquid flow through said flow meter.

27. A flow meter as defined in claim 26, wherein said turbine comprises a central hub rotatably mounted in said turbine cartridge;

a cylindrical outer ring; and a plurality of blades extending radially outwardly from said hub to said ring, each said blade extending at an acute angle with respect to said axis of rotation.

28. A flow meter as defined in claim 27, wherein each said blade has opposed side edges which taper inwardly towards a lateral centerline of said blade such that each said blade, when viewed in transverse cross-section, is generally elliptical in shape.

29. A flow meter as defined in claim 26, wherein said turbine cartridge comprises at least first and second generally cylindrical sections cooperating with one another such that each of said sections rotatably supports one end of said turbine.

30. A flow meter as defined in claim 29, wherein each of said cylindrical sections has an annular outer wall having a maximum thickness of less than 0.15".

31. A flow meter as defined in claim 29, wherein the outer wall of at least one of said cylindrical sections has a maximum thickness of less than 0.063".

32. A filtration system as defined in claim 26, wherein said carrier is a polymer carrier.

33. A turbine for use in a flow meter, said turbine comprising:

(A) a central hub rotatably mountable in a turbine cartridge;

(B) a cylindrical outer ring; and (C) a plurality of blades extending radially outwardly from said hub to said ring, each said blade extending at an acute angle with respect to an axis of rotation of said turbine;
wherein said turbine is made substantially entirely from a magnetic material, wherein said magnetic material comprises a molded composite material comprising a magnetic powder admixed with a carrier.

34. A turbine as defined in claim 33, wherein said angle decreases progressively as the blade extends inwardly from said ring from an initial value to a theoretical value of 0° at a center of said hub.

35. A turbine as defined in claim 34, wherein said initial value is approximately 30°.

36. A turbine as defined in claim 34, wherein said initial value is approximately 36°.

37. A turbine as defined in claim 33, wherein each said blade has opposed side edges which taper inwardly towards a lateral centerline of said blade such that each said blade, when viewed in transverse cross-section, is generally elliptical in shape.

38. A turbine as defined in claim 33, wherein said composite material comprises about 25% to 60% by volume neodymium iron boron, about 40% to 75% by volume nylon, and trace amounts by volume of a flow promotor or a processing agent.

39. A turbine as defined in claim 33, wherein said carrier is a polymer carrier.

40. A turbine for use in a flow meter, said turbine comprising:

(A) a central hub rotatably mountable in a turbine cartridge; and (B) a plurality of blades extending outwardly from said hub;
wherein said turbine is made substantially entirely from a magnetic material, wherein said magnetic material comprises a molded composite material comprising a magnetic powder admixed with a carrier.

41. A turbine as defined in claim 40, wherein said carrier is a polymer carrier.

42. A turbine for use in a flow meter, said turbine comprising:

(A) a central hub rotatably mountable in a turbine cartridge;

(B) a cylindrical outer ring; and (C) a plurality of blades extending radially outwardly from said hub to said ring, each said blade extending at an acute angle with respect to an axis of rotation of said turbine, wherein said angle decreases progressively as the blade extends inwardly from said ring from an initial value to a theoretical value of 0° at a center of said hub, wherein each said blade has opposed side edges which taper inwardly towards a lateral centerline of said blade such that each said blade, when viewed in transverse cross-section, is generally elliptical in shape;
wherein said turbine is made substantially entirely from a magnetic material, wherein said material comprises a molded composite material comprising a magnetic powder admixed with a polymer carrier.

43. A turbine as defined in claim 42, wherein said composite material comprises about 25% to 60% by volume neodymium iron boron, about 40% to 75% by volume nylon, and trace amounts by volume of a flow promotor or a processing agent.

44. A method comprising:

monitoring a flow of liquid through a filter assembly, said monitoring step including (1) placing a turbine in an enclosed stream of liquid flowing through said filter assembly such that the liquid flows axially through said turbine and causes said turbine to rotate at a velocity that varies substantially linearly with a volumetric flow rate of liquid through said filter assembly over more than a designated range of liquid flow rates, said turbine being made substantially entirely out of a magnetic material, wherein said magnetic material comprises a molded composite material comprising a magnetic powder admixed with a carrier, (2) detecting rotation of said turbine, and (3) determining, using the detected turbine rotation and previously-obtained information correlating turbine rotation and liquid flow, information relating to the flow of liquid through the filter assembly.

45. A method as defined in claim 44, wherein said designated range encompasses a ratio of flow rates of at least 3:1.

46. A method as defined in claim 45, wherein said designated range encompasses a ratio of flow rates of at least 10:1.

47. A method as defined in claim 44, wherein the designated range of liquid flow rates extends from about 0.4 gallons per minute to about 3.0 gallons per minute.

48. A method as defined in claim 47, wherein said designated range extends from about 0.4 gallons per minute to about 5.0 gallons per minute.

49. A method as defined in claim 44, wherein said designated range extends from about 0.2 gallons per minute to about 1.5 gallons per minute.

50. A method as defined in claim 44, wherein a pressure drop occurs across said turbine that is less than 3.0 psi at a flow rate of 2.0 gallons per minute and less than 0.5 psi at flow rate of 0.4 gallons per minute.

51. A method as defined in claim 50, wherein a pressure drop occurs across said turbine that is less than 0.5 psi at a flow rate of 2.0 gallons per minute and less than 0.1 psi at a flow rate of 0.2 gallons per minute.

52. A method as defined in claim 44, further comprising displaying the determined information via a visual indicator.

53. A method as defined in claim 52, further comprising disabling energization of said visual indicator whenever no liquid flow through said turbine is detected for a designated period of time.

54. A method as defined in claim 52, further comprising
determining an elapsed time since the filter assembly was installed,
comparing the determined elapsed time to a designated period representing a useful life of the filter assembly,
determining, based upon said comparison, a remaining useful life of the filter assembly,
displaying, in said visual indicator, the determined remaining useful life.

55. A method as defined in claim 52, further comprising
comparing the determined information to designated information representing a rated volumetric capacity of the filter assembly,
determining, based upon said comparison, a volume representing a remaining useful volumetric capacity of the filter assembly,
displaying, in said visual indicator, the determined remaining useful volumetric capacity of the filter assembly.

56. A method as defined in claim 44, further comprising
determining an elapsed time since the filter assembly was installed,
comparing the determined elapsed time to a designated period representing a useful life of the filter assembly, and
providing a humanly-discernable indication that the filter assembly requires replacement if said elapsed time is less than a designated period of time less than said designated period.

57. A method as defined in claim 44, further comprising
comparing the determined information to a designated information representing a useful volumetric capacity of the filter assembly, and
providing a humanly-discernable indication that the filter assembly requires replacement if said determined information comprises a determined volume which is less than a designated volume less than said designated volumetric capacity.

58. A method as defined in claim 44, wherein the monitoring step is performed by a flow meter, and further comprising calibrating the flow meter by measuring the number of turbine revolutions occurring when a designated, previously-known volume of said liquid flows through the filter assembly, and then calculating, using the results of the measuring step, a number of revolutions per unit volume to be used during subsequent flow measurements of said liquid.

59. A method as defined in claim 44, wherein said carrier is a polymer carrier.

60. A method comprising:
monitoring a flow of liquid through a filter assembly, said monitoring step including
(1) placing a turbine in an enclosed stream of liquid flowing through said filter assembly such that the liquid flows axially through said turbine and causes said turbine to rotate at a velocity that varies substantially linearly with a volumetric flow rate of liquid through said filter assembly over more than a designated range of liquid flow rates,
(2) detecting rotation of said turbine, and
(3) determining, using the detected turbine rotation and previously-obtained information correlating turbine rotation and liquid flow, information relating to the flow of liquid through the filter assembly, wherein the step of detecting turbine rotation comprises
(a) generating only one magnetic pulse for each revolution of said turbine,
(b) detecting each pulse using a magnetic pick-up device, and
(c) determining the number of pulses detected during each interval of a selected period of time.

61. A method as defined in claim 60, wherein, throughout said designated range of flow rates, said magnetic pick-up device detects essentially the same number of pulses per gallon.

62. A method comprising:
(A) monitoring a flow of liquid through a filter assembly, said monitoring step including
(1) placing a turbine in an enclosed stream of liquid flowing through said filter assembly such that the liquid flows axially through said turbine and causes said turbine to rotate at a velocity that varies substantially linearly with a volumetric flow rate of liquid through said filter assembly for a range of liquid flow rates which extends from about 0.4 gallons per minute to about 3.0 gallons per minute, said turbine being made substantially entirely out of a magnetic material, wherein said magnetic material comprises a molded composite material comprising a magnetic powder admixed with a carrier,
(2) detecting rotation of said turbine, and
(3) determining, using the detected turbine rotation and previously-obtained information correlating the turbine rotation and liquid flow, information indicative of liquid flow through the filter assembly.

63. A method comprising:
(B) monitoring a flow of liquid through a filter assembly, said monitoring step including
(1) placing a turbine in an enclosed stream of liquid flowing through said filter assembly such that the liquid flows axially through said turbine and causes said turbine to rotate at a velocity that varies substantially linearly with a volumetric flow rate of liquid through said filter assembly for a range of liquid flow rates which extends from about 0.2 gallons per minute to about 1.5 gallons per minute, said turbine being made substantially entirely out of a magnetic material, wherein said magnetic material comprises a molded composite material comprising a magnetic powder admixed with a carrier, (2) detecting rotation of said turbine, and (3) determining, using the detected turbine rotation and previously-obtained information correlating the turbine rotation and liquid flow, information indicative of liquid flow through the filter assembly.

64. A method comprising:

(A) monitoring a volumetric flow of a liquid through an enclosed stream of liquid, said monitoring step including (1) placing a turbine in the enclosed stream such that the flowing liquid causes said turbine to rotate at a velocity that varies with the flow rate of liquid through the enclosed stream, said turbine being made substantially entirely out of a magnetic material, wherein said magnetic material comprises a molded composite material comprising a magnetic powder admixed with a carrier, (2) detecting rotation of said turbine, and (3) determining, using the detected turbine rotation and previously-obtained information correlating the turbine rotation and liquid flow, information indicative of liquid flow through the enclosed stream;

(B) displaying the determined aggregate volume using a visual indicator; and (C) disabling energization of said visual indicator whenever no liquid flow through said turbine is detected for a designated period of time.

65. A method as defined in claim 64, wherein said carrier is a polymer carrier.

66. A method comprising:

monitoring liquid flow through an enclosed stream, said monitoring step being performed by a flow meter and including (1) placing a turbine of the flow meter in the enclosed stream such that the flowing liquid causes said turbine to rotate at a velocity that varies with the flow rate of liquid through the enclosed stream, said turbine being made substantially entirely out of a magnetic material, wherein said magnetic material comprises a molded composite material comprising a magnetic powder admixed with a polymer carrier, (2) detecting rotation of said turbine, and (3) determining, using the detected turbine rotation and previously-obtained information correlating the turbine rotation and liquid flow, information indicative of fluid flow through the enclosed stream; and (D) calibrating the flow meter by measuring the number of turbine revolutions occurring when a designated, previously-known volume of said liquid flows through said turbine, and then calculating, from said measurement, a number of revolutions per unit volume to be used during subsequent flow measurements of said liquid.

67. A method as defined in claim 66, wherein said calibrating step is performed under a temperature, a volume, and a duty cycle projected to occur during normal projected use of said flow meter.

68. A method comprising:

monitoring liquid flow through an enclosed stream, said monitoring step including (1) placing a turbine in the enclosed stream such that the liquid flows axially through said turbine and causes said turbine to rotate, at a velocity that varies substantially linearly with the flow rate of liquid through the enclosed stream, over more than a designated range of liquid flow rates, said turbine being made substantially entirely out of a magnetic material, wherein said magnetic material comprises a molded composite material comprising a magnetic powder admixed with a carrier, (2) detecting rotation of said turbine, and (3) determining, using the detected turbine rotation and previously-obtained information correlating the detected turbine rotation and liquid flow, the aggregate volume of liquid that has flowed through the enclosed stream.

69. A method as defined in claim 68, wherein the designated range of liquid flow rates extends from about 0.4 gallons per minute to about 3.0 gallons per minute.

70. A method as defined in claim 68, wherein said designated range extends from about 0.2 gallons per minute to about 1.5 gallons per minute.

71. A method as defined in claim 68, wherein the step of detecting rotation of said turbine comprises:

generating at least one magnetic pulse for each revolution of said turbine, detecting each pulse using a detector, and determining the number of pulses detected during each interval of a selected period of time.

72. A method as defined in claim 68, further comprising displaying the determined aggregate volume via a visual indicator.

73. A method as defined in claim 68, wherein said carrier is a polymer carrier.

* * * * *

UNITED STATES PATENT AND TRADEMARK OFFICE
CERTIFICATE OF CORRECTION

PATENT NO. : 5,876,610
DATED : March 2, 1999
INVENTOR(S) : Clack et al.

It is certified that error appears in the above-identified patent and that said Letters Patent is hereby corrected as shown below:

Col. 9, line 53 delete "$\alpha$with" and insert --$\alpha$ with--.

Col. 17, line 40 after "angle" delete "a" and insert --$\alpha$--.

Col. 17, line 63 after "(2)" delete "protector" and insert --a detector--.

Col. 24, line 61 delete "(B)".

Col. 25, line 39 before "monitoring" insert --(A)--.

Col. 26, line 3, before "calibrating" delete "(D)" and insert --(B)--.

Signed and Sealed this

Thirteenth Day of July, 1999

Attest:

Q. TODD DICKINSON

*Attesting Officer*    *Acting Commissioner of Patents and Trademarks*